(12) United States Patent
Blank et al.

(10) Patent No.: US 12,051,108 B2
(45) Date of Patent: Jul. 30, 2024

(54) AUTOMATIC COLLATERAL EXCHANGE FOR REHYPOTHECATED COLLATERAL

(71) Applicant: THE BANK OF NEW YORK MELLON, New York, NY (US)

(72) Inventors: Brian Blank, Manalapan, NJ (US); Tejas Jhaveri, Piscataway, NJ (US); Mahendran Gunaseelan, Chennai (IN); Mariappan Gopal, Chennai (IN); Kim Lee, Queens Village, NY (US)

(73) Assignee: The Bank of New York Mellon, New York, NY (US)

( * ) Notice: Subject to any disclaimer, the term of this patent is extended or adjusted under 35 U.S.C. 154(b) by 556 days.

(21) Appl. No.: 16/438,970

(22) Filed: Jun. 12, 2019

(65) Prior Publication Data

US 2019/0295174 A1    Sep. 26, 2019

Related U.S. Application Data

(63) Continuation of application No. 14/146,390, filed on Jan. 2, 2014, now abandoned.

(60) Provisional application No. 61/748,633, filed on Jan. 3, 2013.

(51) Int. Cl.
  *G06Q 40/04*    (2012.01)
(52) U.S. Cl.
  CPC .................... *G06Q 40/04* (2013.01)
(58) Field of Classification Search
  CPC ....................................................... G06Q 40/04
  USPC ........................................................... 705/37
  See application file for complete search history.

(56) References Cited

U.S. PATENT DOCUMENTS

| | | | |
|---|---|---|---|
| 6,018,721 | A  | 1/2000  | Aziz et al. |
| 7,577,601 | B1 | 8/2009  | Rademacher et al. |
| 2009/0276370 | A1 | 11/2009 | Olson et al. |
| 2010/0030705 | A1 | 2/2010  | Tharmananthar et al. |

(Continued)

OTHER PUBLICATIONS

J.P. morgan introduces auto allocation capabilities to collateral management platform in japan. (Jun. 27, 2012). M2 Presswire Retrieved from https://dialog.proquest.com/professional/docview/1022296435?accountid=131444 (Year: 2012).*

(Continued)

*Primary Examiner* — Hani M Kazimi
(74) *Attorney, Agent, or Firm* — Pillsbury Winthrop Shaw Pittman, LLP

(57) ABSTRACT

In certain embodiments, concurrency related to rehypothecated allocations may be facilitated via pre-release locking of associated positions. In some embodiments, a request to release a collateral allocation may be obtained, where the collateral allocation is associated with (i) a rehypothecated position and (ii) a cloned position on a leg downstream of the rehypothecated position, and the cloned position is derived from the rehypothecated position. Based on the release request, one or more legs related to the collateral allocation may be traversed to locate and lock one or more positions on such related legs (e.g., including the cloned position of the downstream leg). Prior to release of the rehypothecated position, the cloned position of the downstream leg may be locked based on the release request. The release of the rehypothecated position may be performed to fulfill the release request in response to the cloned position of the downstream leg being locked.

20 Claims, 17 Drawing Sheets

(56) References Cited

U.S. PATENT DOCUMENTS

| | | |
|---|---|---|
| 2010/0228665 A1 | 9/2010 | Mathieson et al. |
| 2010/0250466 A1 | 9/2010 | Joseph |
| 2011/0191233 A1 | 8/2011 | Russo et al. |
| 2011/0231307 A1 | 9/2011 | Caffrey et al. |
| 2013/0318006 A1 | 11/2013 | Morik et al. |
| 2015/0032591 A1 | 1/2015 | Jacob |
| 2015/0081501 A1 | 3/2015 | Chakar et al. |
| 2015/0081591 A1 | 3/2015 | Chakar et al. |

OTHER PUBLICATIONS

Final Office Action U.S. Appl. No. 14/146,390 dated Dec. 14, 2018.
Final Office Action U.S. Appl. No. 14/146,390 dated Apr. 5, 2018.
Non-final Office Action U.S. Appl. No. 14/146,390 dated Jun. 1, 2017.
Final Office Action U.S. Appl. No. 14/146,390 dated Jan. 14, 2016.
International Preliminary Report on Patentability and Written Opinion of the International Searching Authority dated Jul. 16, 2015 issued in corresponding International Patent Application No. PCT/US2014/010072.
Non-final Office Action U.S. Appl. No. 14/146,390 dated Jul. 6, 2015.
M. Singh et al., "The (sizeable) Role of Rehypothecation in the Shadow Banking System", IMF Working Paper, Monetary and Capital Markets Department, Jul. 2010, 16 pgs.
International Search Report and Written Opinion dated Apr. 22, 2014, issued in corresponding International Patent Application No. PCT/US2014/010072.

\* cited by examiner

| :- Delete Dealer Positions | | | | |
|---|---|---|---|---|
| Domestic 1 01/10/2011 ▼ | Domestic 2 01/10/2011 ▼ | Global 01/10/2011 ▼ | Far East Not Available ▼ | |
| 🖨 Printer Friendly | | | ⊞ Start New Search | |
| Basic Selection Criteria | | | | |
| From Systems: [Domestic 2 ▼] Display: [100 ▼] per page | | | | |
| Sec. ID Type [Any - Any ▼]<br>Number: | | | | |
| Positions: [All ▼] [Security Type ▼] [ ] [ ] [ ] | | | | |
| Per Range: [ Minimum ] [ Maximum ] | | | | |
| Find by Dealer Box | | | | |
| Dealer Box equals:<br>Ⓡ [SAL] [FIND] | | | | |

Release Request - Leg Summary

| Domestic 1 09/23/2011 I | Domestic 2 09/23/2011 I | Global 09/23/2011 I | Far East 09/23/2011 I | myQuickAccess  add to QuickAccess
User Guide(pdf) - Overview

Originating Request

Orig Dealer ID : VIN  Orig Release Type : FED  Security ID : XX XXXXXXX  Source System : G1
Orig Dealer Box : VIN  Orig Trans ID : XYZ456  Depository : FED  Par Requested : 20,428,900.00

Leg Summary showing 1 - 2 of 2

| ACEInstrId | Cloned From | Cloned To | Leg Num | Dealer Box | PAR Requested | PAR Released | Status | Created Date Time | Modified Date Time |
|---|---|---|---|---|---|---|---|---|---|
| 13723 | | | 1 | VIN | 20,428,900.00 | 0.00 | FAIL_INSUF | 09/23/2011 11:03:14 | 09/23/2011 11:03:25 |
| 13724 | 1S001B | | 2 | OIZ | 20,428,900.00 | 0.00 | FAIL_INSUF | 09/23/2011 11:03:20 | 09/23/2011 11:03:21 | showing 1 - 2 of 2

FIG. 11

Release Request - Leg Details

| Domestic 1 09/23/2011 | Domestic 2 09/23/2011 | Global 09/23/2011 | Far East 09/23/2011 |
|---|---|---|---| myQuickAccess  add to QuickAccess
User Guide(pdf) - Overview

Originating Request

Orig Dealer ID :  
Orig Dealer Box : OIZ  
Orig Release Type : ACE  
Orig Trans ID : XYZ456  
Security ID : XX XXXXXXX  
Depository : GCF  
Source System : G1  
Par Requested : 20,428,900.00

Leg Details

Recent Work Plans showing 1 - 1 of 1

| ACEInstrId | ACECorIsAtmptId | AcctNum | ACE Instr Status | Elig Code | PAR Released | Par | Work Plan Message | Time Stamp |
|---|---|---|---|---|---|---|---|---|
| ⓘ 13724 | 22968 | 1S002B | FAIL_INSUF | N | 0.00 | 20,428,900.00 | Dealer-Controlled Account | 09/23/2011 11:03:21 | showing 1 - 1 of 1

FIG. 12

Reprocess Release Requests

Printer Friendly | Download | | | | | | | Show Your Selection Criteria
Check All | Reset All | | | | | Start New Search | | | Confirm showing 1 - 1 of 5

| Sys | Dealer ID | Dealer Box | Deal ID | Par Requested | Par Released | Security ID | Release Type | Orig Trans ID | Status | Created Date Time | Modified Time |
|---|---|---|---|---|---|---|---|---|---|---|---|
| ☐ 2 | 599 | 599 | -- | 200,000.00 | 200,000.00 | | Fed Auto Sub | ABC123 | Failed Location | MM/DD/YYYY 12:00:02 | 14:00:00 |
| ☐ 2 | BZP | BZW | BZP001 | 35,000.00 | 35,000.00 | XXX | Unwind | DEF456 | Failed Location | MM/DD/YYYY 12:00:01 | 13:00:00 |
| ☐ 2 | BZP | RCL | BZP002 | 8,000.00 | 8,000.00 | | Deal Cancel | GHI789 | Failed Location | MM/DD/YYYY 12:00:01 | 13:00:00 |
| ☐ 3 | GSI | GSI | -- | 1,000.00 | 1,000.00 | XXXX X | DTC Auto Sub | JKL123 | Failed Location | MM/DD/YYYY 12:00:03 | 15:00:00 |
| ☐ 1 | MGN | MOR | -- | 16,000.00 | 16,000.00 | XXXXXXXX | Fed Auto Sub | XYZ456 | Failed Location | MM/DD/YYYY 12:00:00 | 12:00:00 | showing 1 - 1 of 5

FIG. 13

AUTOMATIC COLLATERAL EXCHANGE FOR REHYPOTHECATED COLLATERAL

This application is a continuation of U.S. patent application Ser. No. 14/146,390, filed Jan. 2, 2014, which claims the benefit of priority to U.S. Provisional Application No. 61/748,633, filed Jan. 3, 2013, each of which are hereby incorporated by reference.

BACKGROUND

This application is directed to computer-implemented systems and methods useful for managing collateral allocations in financial transactions. While aspects of this application may be associated with other types of collateral allocations, the computerized systems and methods for allocating collateral described herein may be in reference to Repurchase Agreements ("Repos"), where the collateral is managed by a third party agent (a "Tri-Party agent") in Tri-Party Repos.

In a Repo, a seller (dealer/borrower/cash receiver) sells securities for cash to a buyer (lender/cash provider) and agrees to repurchase those securities at a later date for more cash. The Repo rate is the difference between borrowed and paid back cash expressed as a percentage. The buyer typically utilizes Repos to invest cash for an agreed upon duration of time (typically overnight, although the term may vary), and would receive a rate of interest in return for the investment. The seller typically utilizes Repos to finance long positions in securities or other assets in the seller's portfolio.

Repos are financial instruments used in money markets and capital markets, and are economically similar to a secured loan, with the buyer receiving securities as collateral to protect against default. Virtually any security may be employed in a Repo, including, for example, Treasury or Government bills, corporate and Treasury/Government bonds, stocks/shares, or other securities or financial instruments. In a Repo, however, the legal title to the securities clearly passes from the seller to the buyer, or "investor". Coupons (installment payments that are payable to the owner of the securities), which are paid while the Repo buyer owns the securities are, in fact, usually passed directly onto the Repo seller. This may seem counterintuitive, as the ownership of the collateral technically rests with the buyer during the Repo agreement. It is possible to instead pass on the coupon by altering the cash paid at the end of the agreement, though this is more typical of Sell/Buy Backs.

Although the underlying nature of a Repo transaction is that of a loan, the terminology differs from that used when talking of loans because the seller does actually repurchase the legal ownership of the securities from the buyer at the end of the agreement. Although the actual effect of the whole transaction is identical to a cash loan, in using the "repurchase" terminology, the emphasis is placed upon the current legal ownership of the collateral securities by the respective parties.

In a Tri-Party Repo, the collateral is managed by a Tri-Party agent (typically a bank), who may match the details of the trade agreed upon by the buyer and the seller, and assume all of the post trade processing and settlement work. The Tri-Party agent controls the movement of securities, such that the buyers do not actually take delivery of collateralized securities. The Tri-Party agent acts as a custodian for the collateral, and allows the flow of collateral and cash between buyers and sellers across one or more deals.

In some Repo agreements, the seller/dealer may have numerous assets that are being managed by the Tri-Party agent. In these cases, it may be desirable for the Tri-Party agent to allow for the restructuring of the collateral of the deals, so that the seller may free up some assets while placing other agreeable assets in the legal ownership of the buyer, during the deal. Such movements would generally be agreed to by the buyer and the seller when entering the agreement to be managed by the Tri-Party agent.

In some deals, the Tri-Party agent may be authorized to utilize the collateral that has been deposited therewith for their own purposes. Such utilization of the collateral is known as rehypothecation, and may be for any appropriate purpose, including but not limited to backing the transactions and trades made by the Tri-Party agent. In exchange for permitting rehypothecation, the party who deposits the securities as collateral (e.g., the seller/dealer) may be compensated, such as by receiving a lower cost of borrowing for various deals, or by receiving a fee discount from the Tri-Party agent.

Among other things, what is needed is a system and method for managing collateral in financial transactions, simplifying and improving the allocations of collateral (e.g., those associated with Tri-Party Repos in a dealer's portfolio) while accounting for collateral that has been rehypothecated.

SUMMARY

Through various embodiments described herein, the system and method of this disclosure enhances the allocations of collateral associated with financial deals. For example, various embodiments provide functions relating to automated exchange of collateral within the deals while satisfying the requirements of the deal, and the preferences of those participating in the deal. Further, various embodiments may track positions (e.g., collateral allocations) that have been rehypothecated into other deals, to facilitate releasing such positions.

Various embodiments of this disclosure may be used in conjunction with existing financial services platforms, for example the Bank of New York Mellon's Tri-Party repurchase agreement products (RepoEdge®) which allow clients to outsource the operational aspects of their collateralized transactions, and Derivatives Margin Management (DM Edge®), which helps clients manage credit risks associated with derivatives transactions by enabling them to accept, monitor and re-transfer collateral. These services, among others such as Repo Margin Management (RM Edge®), MarginDirect$^{SM}$, and Derivatives Collateral Net (DCN), may be delivered to clients through AccessEdge$^{SM}$, a real-time, web-based portal.

The operator/manager of the system and method of this disclosure acts as a third-party service provider to the two principals to a trade, and the various functions performed by the system and method provide value-added services which mitigate risk and lead to greater efficiencies for both parties.

According to an embodiment, a system for managing rehypothecated collateral allocations in one or more financial transactions includes one or more processors coupled to one or more memory elements configured to store deal attributes. The one or more processors are operable to execute at least one collateral allocation module. The at least one collateral allocation module when executed, is operable to receive a request to release a collateral allocation, identify the collateral allocation in one or more deals at a first level, and identify a rehypothecated portion of the collateral allocation in one or more deals at one or more subsequent levels.

Where an entirety of the collateral allocation is identified at each subsequent level, the collateral allocation module is operable to credit the one or more deals at each subsequent level with net free equity (NFE) equal to an amount of cash to be exchanged at a prior level of the one or more subsequent levels. When a total of the net free equity credit is equal to an amount of cash to be exchanged at the first level, the collateral allocation module is operable to release the collateral allocation.

According to another embodiment, a computer-implemented method for managing rehypothecated collateral allocations in one or more financial transactions includes receiving, at one or more processors coupled to one or more memory elements configured to store deal attributes, a request to release a collateral allocation. The method also includes identifying, at the one or more processors, the collateral allocation in one or more deals at a first level. The method also includes identifying, at the one or more processors, a rehypothecated portion of the collateral allocation in one or more deals at one or more subsequent levels. Where an entirety of the collateral allocation is identified at each subsequent level, the method additionally includes crediting, via the one or more processors, the one or more deals at each subsequent level with net free equity (NFE) equal to an amount of cash to be exchanged at a prior level of the one or more subsequent levels. When a total of the net free equity credit is equal to an amount of cash to be exchanged at the first level, the method further includes releasing, via the one or more processors, the collateral allocation.

The system and method of this disclosure provides various capabilities as discussed more fully in the detailed description below.

BRIEF DISCUSSION OF THE DRAWINGS

FIG. 1 provides a functional block diagram of an embodiment of a computer-implemented and networked system for collateral management;

FIG. 2 schematically illustrates an embodiment of a release process associated with collateral allocations;

FIG. 3-1 and FIG. 3-2 schematically illustrate an embodiment of a release process associated with releasing rehypothecated FED collateral;

FIG. 4 schematically illustrates an embodiment of a Net Free Equity credit process for rehypothecated collateral;

FIG. 5 illustrates an embodiment of a user interface configured for deleting dealer positions;

FIG. 6-1 and FIG. 6-2 schematically illustrate an embodiment of a release process associated with releasing rehypothecated DTC collateral;

FIG. 7-1 and FIG. 7-2 schematically illustrate an embodiment of a release process associated with internal position movements;

FIG. 8-1 and FIG. 8-2 schematically illustrates an embodiment of a cancellation request process;

FIG. 9 illustrates an embodiment of a user interface configured to identify various release requests;

FIG. 11 illustrates an embodiment of a user interface configured to display a summary of legs associated with rehypothecated transactions.

FIG. 12 illustrates an embodiment of a user interface configured to display details of a leg associated with a rehypothecated transaction; and FIG. 13 illustrates an embodiment of a user interface configured to display release requests for selection of reprocessing thereof.

DETAILED DESCRIPTION

Figure 1:
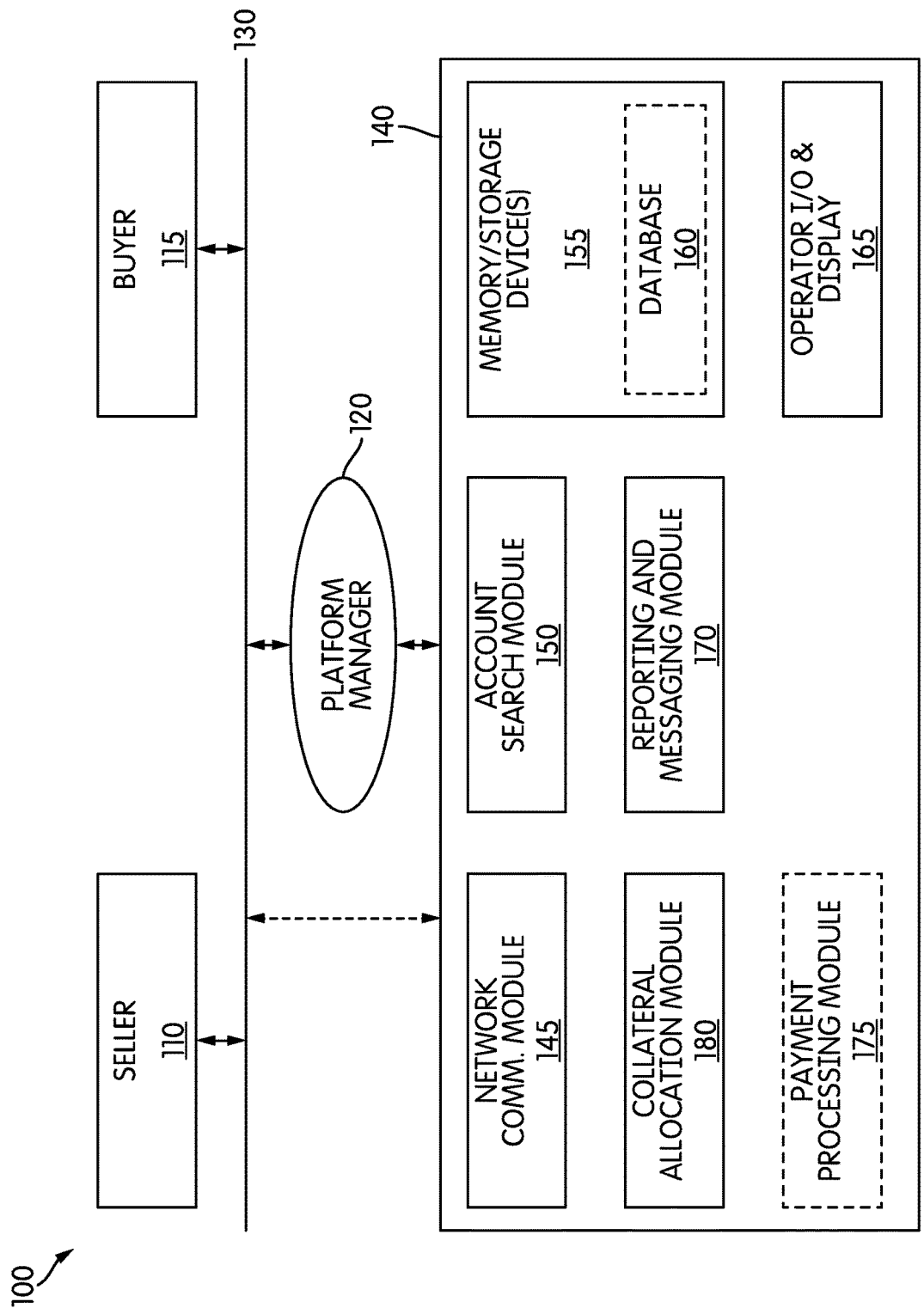

In the discussion of various embodiments and aspects of the system and method of this disclosure, examples of a processor may include any one or more of, for instance, a personal computer, portable computer, personal digital assistant (PDA), workstation, or other processor-driven device, and examples of network may include, for example, a private network, the Internet, or other known network types, including both wired and wireless networks.

Those with skill in the art will appreciate that the inventive concept described herein may work with various system configurations. In addition, various embodiments of this disclosure may be made in hardware, firmware, software, or any suitable combination thereof. Aspects of this disclosure may also be implemented as instructions stored on a machine-readable medium, which may be read and executed by one or more processors. A machine-readable medium may include any mechanism for storing or transmitting information in a form readable by a machine (e.g., a computing device, or a signal transmission medium), and may include a machine-readable transmission medium or a machine-readable storage medium. For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions.

Described herein is an exemplary algorithm which may be implemented through computer software running in a processor to determine optimal collateral allocations based on user-selected criteria. This algorithm is not intended to be limiting, but is merely provided to describe one way of accomplishing the functions associated with determining optimal collateral allocations.

In the discussion of various embodiments and aspects of the system and method of this disclosure, examples of trading parties include, but are not limited to, broker-dealers, institutional investors, and hedge fund managers.

In various embodiments, a web-based collateral management system or platform links dealers with investors to conduct collateral transactions in a safe, efficient, and reliable way. Online dealers and investors can manage collateral among a diverse range of instruments, including Tri-Party repo agreements in all major currencies, securities lending transactions, municipal deposits, bank loans, derivatives transactions, letters of credit, and structured trades, for example. The system may be managed by the Tri-Party agent, and may additionally provide, for example, daily mark-to-market valuations, haircuts/margins, and concentration limits (i.e., maintain percentages of market capitalization, dollar amount limits for a particular security, or a percentage of the portfolio in a particular security, for example), as well as manage, track, and settle collateral transactions across global capital markets by working collaboratively with clients to provide collateral transparency. The enhanced collateral allocation aspect of this disclosure may allow dealers (i.e. the sellers in Repos) to control and/or automatically permit the shifting of collateral associated with a plurality of deals that are under the management of the Tri-Party agent, even though the collateral is titled to the buyers in the Repo. Such transfers may "optimize" the allocations, so, for example, the fewest number of deals are under-collateralized or over-collateralized, while the collateral allocations meet buyer and/or seller requirements for the deals, as described in greater detail below.

FIG. 1 illustrates a functional block diagram of an embodiment of post-trade management system 100. Post-trade management system 100 is established to permit seller 110 and buyer 115 to access collateral management system 140 via network 130 and platform manager 120, or optionally bypasses platform manager 120. Collateral management system 140 may utilize one or more processors (not shown), housed within one or more computers, which may be networked together by any appropriate mechanism, including, for example, network 130. The one or more processors are configured to run one or more modules, as described below. For example, the modules of collateral management system 140 may include network communication module 145, configured to process external communications between collateral management system 140 and network 130. Account search module 150 may be configured to search one or more databases associated with client assets held in custody for, or for the benefit of various existing clients of platform manager 120. Account search module 150 may be configured to search for a particular type of security or asset, a particular security issuer, or a security rating, for example. In some embodiments, account search module 150 may be configured to access memory storage device(s) 155, which may include one or more databases 160 therein. Memory storage device 155 may be any type of conventional storage mechanism for example, one or more hard drives, solid state drives, network storage, random access memory (RAM), combinations thereof, or so on. Database 160 may be any type of appropriate database, as would be known by a person of ordinary skill in the art, for example. Operator input/output and display module 165 represents various techniques and computer peripheral devices for providing operator input and output to collateral management system 140. In some embodiments, operator input/output and display module 165 may communicate with network communication module 145, to provide seller 110 and/or buyer 115 with remote access to collateral management system 140 via network 130.

Collateral management system 140 may additionally include reporting and messaging module 170, which may be configured to provide standard and/or custom report and messaging formats that may be transferred to network 130 by collateral management system 140, (optionally) through platform manager 120, or through an alternate communications path illustrated by the dashed double-ended arrow in FIG. 1. In some embodiments, collateral management system 140 may include payment processing module 175, indicated in dashed lines, which may have optional functionality associated with business payment activities for services rendered by the system manager (e.g. the third party agent) in processing, evaluating, and optimizing reallocation of collateral for managed deals such as the Tri-Party Repos. As further shown in FIG. 1, and described in greater detail below, collateral management system 140 further includes collateral allocation module 180, which may be configured to us the one or more processors to evaluate various security positions that are being utilized as collateral for a Repo deal, or may be eligible to be utilized in a Repo deal, and ascertain the allocations of the security positions across a plurality of Repo deals.

Figure 2:
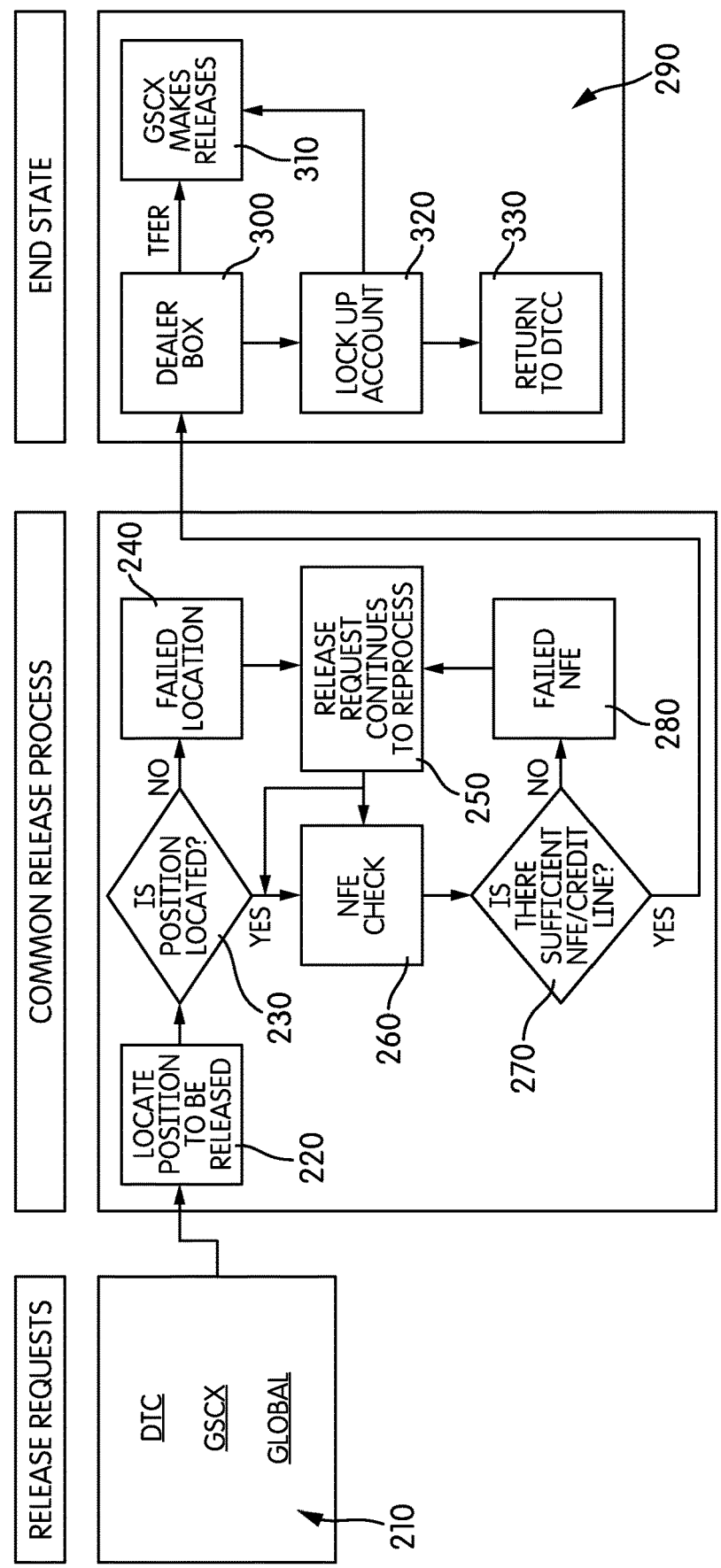

FIG. 2 illustrates an embodiment of a workflow 200 for processing release requests for positions that are located in tri-party accounts. It may be appreciated that workflow 200 may be configured to optimize or otherwise enhance or make more efficient the allocations of collateral across a plurality of the Repo deals, in particular where collateral has been rehypothecated by the third party agent. Conventionally, different domestic workflows are utilized to process deliveries for DTC or FED securities (which may be processed through DTCC or GSCX respectively). For example, releases for DTC securities may comprise locating positions and moving them only for the leg 1 dealer initiating the release request. As such, problems may arise where the position has been cloned downstream to at least one other dealer. Specifically, if the position has been removed and delivered out without retrieving the downstream position, then conventional systems may inappropriately allow those other dealers to use those positions. While the leg 1 dealer may swap that position out for another, there is the risk of phantom positions existing in the conventional system in the interim amount of time prior to the swap. GSCX deliveries are conventionally processed in a different fashion due to the fact that most FED securities are unwound and automatically returned back to the Dealer Boxes on GSCX, which facilitates access between Dealers and their collateral. Such processing may amount to an intraday loan of the entire value of the deal from the system manager to the dealer. For term deals, dealers may be able to remove or substitute out the needed security versus cash. For both FED and DTC securities, Net Free Equity (NFE) processing may assess whether the security can be delivered or not.

In an embodiment, the collateral allocation module 180, or other features of the post-trade management system 100 may be configured to receive release requests 210 from multiple sources. For example, the release request may be from DTC or GSCX, as shown in FIG. 2. FIG. 2 also shows that release requests from global depositories may be implemented in some embodiments. Once a Release Request is received, the collateral management system 140 may automatically locate the position at 220. In an embodiment, the position may be located at 220 based on a list of priorities, as described in greater detail below. If it is determined at 230 that the position has not been located, workflow 200 may proceed at 240 to indicate a failed location, and proceed at 250 to continue to reprocess the release request. If the position is located at 220 (as determined at 230), or following the reprocessing at 250 where the position is located, workflow 200 may proceed to perform an NFE check at 260 to assess if the position can be released. In an embodiment, the NFE check at 260 may be based on the type of release request. In an embodiment, the NFE check at 260 may be based on a formula that includes the cash amount to be exchanged and the Net effect of the position being removed. Accordingly, the workflow 200 may determine at 270 if there is sufficient NFE/credit line. If not, then a failed NFE may be indicated at 280, and the workflow 200 may return to 250, where the release request continues to reprocess. If there is sufficient NFE/credit line, then workflow 200 may enter an end state 290. As shown, in the end state 290, the position to be released may be moved to the dealer box 300. In some embodiments, the position may be transferred for the GSCX to make the release for delivery at 310. In an embodiment, the account may be locked at 320 before the GSCX may make the release. In an embodiment, such locking at 320 may be because the position cannot yet be removed. Additionally, in some embodiments the position may be released to the DTCC, at 330.

In an embodiment, if a position has been cloned to a downstream deal, then the location process at 220 may begin again on leg 2. This location process 220 may continue until it has located the position and identified the final leg. The system may assess the availability of that position and remove or delete the cloned position. In an embodiment, an NFE credit may be given to the downstream dealers to compensate for the temporary loss of the position. The downstream release process may continue until ultimately the leg 1 position is available to be released for delivery at the end state 290. It may be appreciated that in some situations releases may fail. In an embodiment, users and/or dealers may be able to monitor the failings (e.g., in log form), and may be able to identify issues or actions required for successful releases.

To facilitate implementation of reallocating rehypothecated collateral in the post-trade management system 100, it may be appreciated that the collateral allocation module 180, or other features of the collateral management system 140, may support position tracking. Position tracking is the ability for reverse repurchase agreements to track how much collateral was cloned downstream, and, for associated rehypothecation dealer boxes, to identify the original source and amount of the collateral. In an embodiment, legacy rehypothecation cloning may track changes to collateral in a message table (e.g., a transaction journal) through the last approval or time of that deal. Such tracking may typically be implemented with overnight reverse repo deals. For term reverse repo deals, however, some workflows may remove collateral in the reverse repo first, creating phantom positions in the downstream deals. Other workflows POOF (e.g., delete) the downstream collateral first, preventing phantom positions. Such POOFing may generally prevent the existing reverse repo transaction journal from having the data needed to make an informed decision on what needs to be cloned. By tracking positions, however, the data may be maintained. Furthermore, when POOFing the position in the downstream leg, a temporary NFE credit may be applied. The dollar amount of collateral cloned may be needed to calculate the NFE credit in some embodiments.

The collateral management system 140 may also be configured to perform monitoring of the reverse repo and/or NFE credits. Specifically, the source of the collateral, the amount of the collateral, and the size of the reverse repo deals feeding the rehypothecated dealer box (e.g., in USD) may be monitored for each rehypothecated dealer box. Such information may facilitate identifying how much NFE credit to apply as a result of POOFing a position. In an embodiment, any change to the loan amount (e.g., deal creation, modification, cancel, or unwind) may also be reflected. In an embodiment, a change to the loan amount may also cause an automatic adjustment to the NFE credit. In an embodiment, the amount of NFE credit given may be tracked, so that the credit may be removed when a new position is obtained from the reverse repo feeding the dealer box.

It may be appreciated that, in some embodiments, the rehypothecated collateral release process may vary depending on whether the request is a FED collateral exchange request or a DTCC collateral exchange request. In some embodiments FED securities may be associated with GSCX systems. As described in greater detail below, if the position is located in downstream legs (i.e. is rehypothecated), the system may generate a release request for each downstream leg, and then release the position from each upstream leg, as long as it meets the acceptable conditions. Once the position is located, the system may attempt to release the collateral from the furthest downstream leg, to the next upstream leg. After the position from each leg is successfully released, the automatic collateral exchange request may be fulfilled and the position can be returned back to the associated system (e.g., GSCX). When the system has determined there is not enough available par to make the release request (and, for example, all possible paths have been considered), it may send a rejection indicator to GSCX immediately. Additionally, if there is insufficient credit to make the release request on any of the legs (and all possible paths have been considered), the system may also indicate rejection to GSCX.

Figures 1, 3:
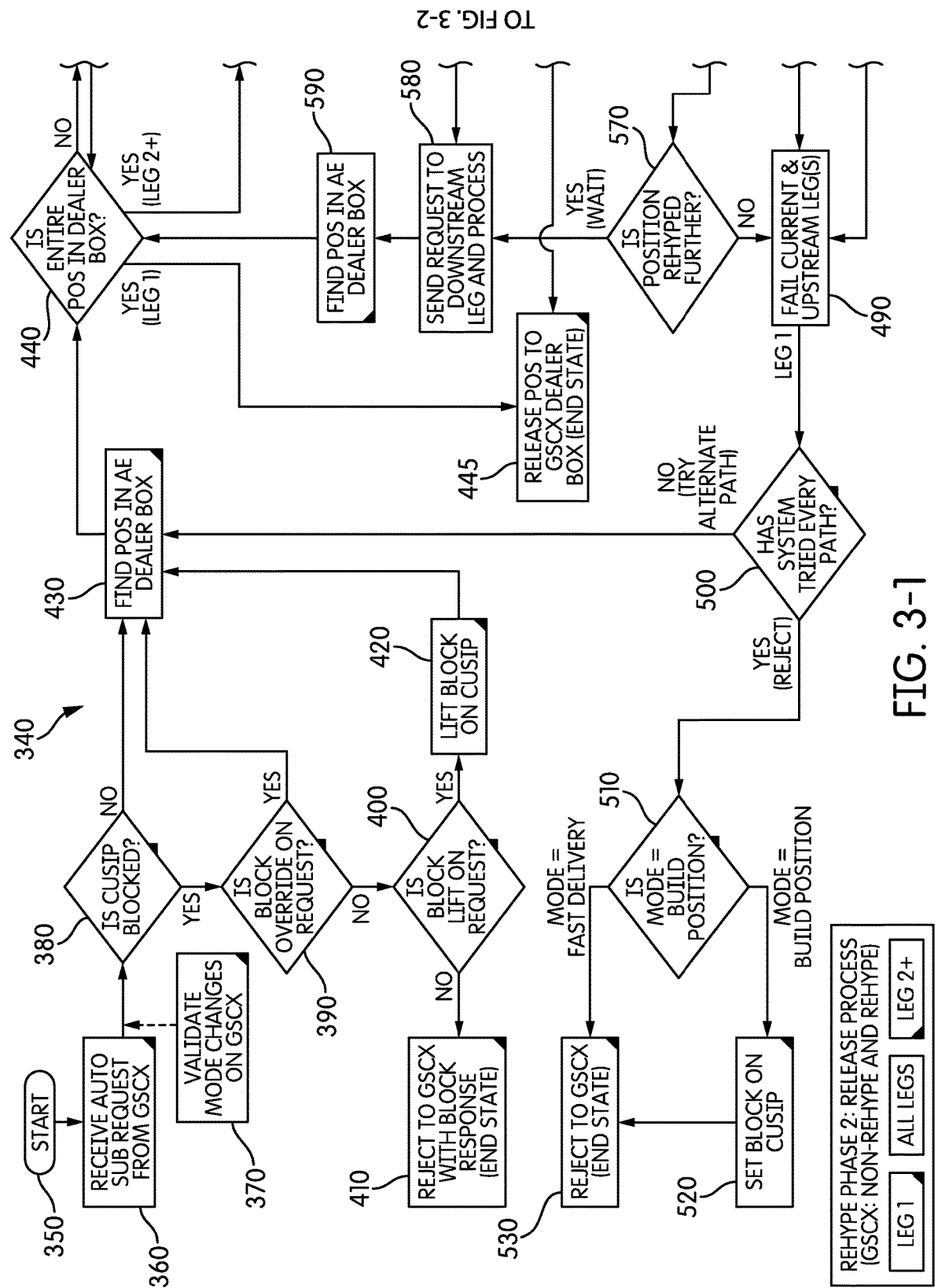
Figures 2, 3:
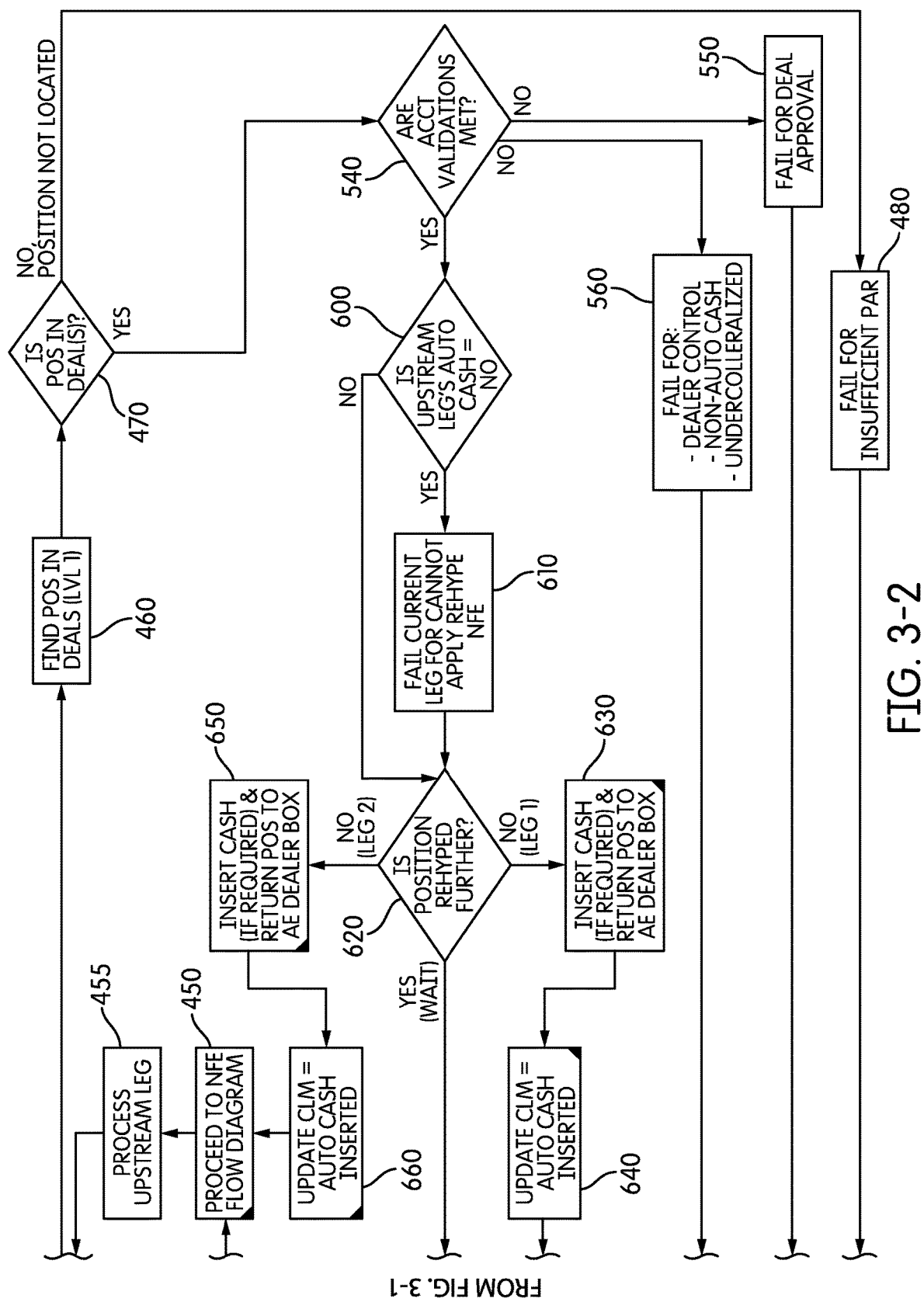

FIG. 3-1 and FIG. 3-2 illustrates an embodiment of a rehypothecated collateral release process 340 for a FED collateral exchange request. Process 340 starts at 350, and at 360 includes receiving an automatic collateral exchange from GSCX. In an embodiment, process 340 includes validating mode changes on GSCX at 370. Prices 340 may continue at 380 by determining if the CUSIP (i.e., the code indicating the security) is blocked. A block may initially be placed on the CUSIP when a particular release request in a build position mode (as opposed to a fast delivery mode) has failed, and has rejected to GSCX. Such a block may prevent subsequent requests for the same CUSIP and dealer box from being released, and might not be altered until a block type message is received from GSCX. An example of a block type message may include a "Lift Block" message, which may remove the block for that transaction, and try to release the CUSIP if it meets release parameters. If the system is unable to release the position, the system may put the block back on the CUSIP, and may reject further release requests for that CUSIP. Another message may include an "override" message, which may allow the system to attempt to process the particular CUSIP alone if it meets the release parameter. As such, if the CUSIP is blocked in the illustrated embodiment, then it may be determined at 390 if a block override is on request. If a block override is not on request, then it is determined at 400 if a block lift is on request. If a block lift is not on request, the process 340 may terminate at 410 by rejecting to GSCX with the block response. If the lift block lift is on request at 400, then the block on the CUSIP may be lifted at 420. Once the block is lifted at 420, or if the CUSIP is not blocked at 390, or if the override is on request at 390, then process 340 may continue at 430 by finding the position in the dealer box.

It may be determined at 440 whether the entire position is in the dealer box. If so, under leg 1, the position may be released to the GSCX dealer box at 445, and process 340 may terminate. If so under leg 2 or more (as described below), then process 340 may proceed to implement an NFE process flow 450, described in greater detail below, before processing the upstream leg at 455, and determining again if the entire position is in the dealer box at 440. If the entire position is not in the dealer box at 440, then process 340 may continue at 460 by finding the position in the deals (e.g., at level 1). Specifically, the system may locate the positions to be released in the deals, and assign a priority number to each deal. The priority number may be assigned from order of most desirable to least desirable. Process 340 may then continue at 470 by determining if the position is currently in one or more deal. If the position is not located in one or more deal(s) at 470, then process 340 may indicate failure for insufficient par at 480. This failure may also indicate failure for current and upstream leg(s) at 490. Process 340 may then determine at 500 if, for leg 1, the system has tried every path.

If not, then process 340 may return to 430, trying an alternate path. If every path was attempted, then a rejection may be indicated, and process 340 may determine at 510 if the release request is in a build position mode. If so, then process 340 may set a block on the CUSIP at 520. Once the block is set, or if the release request is not in a build position mode (but is rather in a fast delivery mode, for example), then process 340 may terminate at 530 by rejecting to GSCX.

If it is determined at 470 that the positions are in one or more deals, then process 340 may determine at 540 if account validations are met. If not, then in some instances the process 340 may fail for deal approval at 550, which may proceed to failing current and upstream legs at 490. If account validations are not met at 540 then process 340 may additionally or alternatively fail for dealer control, non-auto cash, or undercollateralization at 560 Failing for auto cash may be understood as failing because the release of collateral does not meet auto cash collateral maintenance level requirements. Failing for dealer control may be understood as occurring because the deal is a dealer controlled account. Failing for undercollateralization may be understood as occurring because while the account is eligible for auto cash, the total cash and position collateral value is less than the required deal amount according to system constraints. Process 340 may then continue at 570 by determining if the position is further rehypothecated. If not, then process 340 would again fail at 490. If so, then (after some delay), process 340 may continue at 580 by sending the request to downstream legs and processing. As such, process 340 may proceed at 590 by finding the position in the dealer box for the second (or subsequent) leg.

If account validations are met at 540, then it may be determined at 600 if the upstream leg's auto cash has a no condition. If so, then process 340 may fail the current leg at 610, as the rehypothecated NFE could not be applied. If not, or after the leg is failed at 610, then it may be determined at 620 whether the position is further rehypothecated. If the position is further rehypothecated, then (after a delay), the request may be sent to the downstream leg and processed, at 580. If the position is not further rehypothecated at 620, then under leg 1, cash may be inserted (if required) at 630, and the position may be returned to the dealer box. Among other reasons, it may be appreciated that cash may not be required if the deal is overcollateralized, and removal of the collateral would not take the deal short. Process 340 may in some embodiments update the collateral maintenance level (e.g., by inserting auto-cash) at 640, before releasing the position to the GSCX dealer box in the end state at 445. If the position is not further rehypothecated at 620, then under leg 2 or more, cash may be inserted (if required) at 650, and the position may be returned to the dealer box. Process 340 may in some embodiments update collateral maintenance level (e.g., by inserting auto-cash) at 660, before proceeding to the NFE workflow at 450, described in greater detail below.

Figure 4:
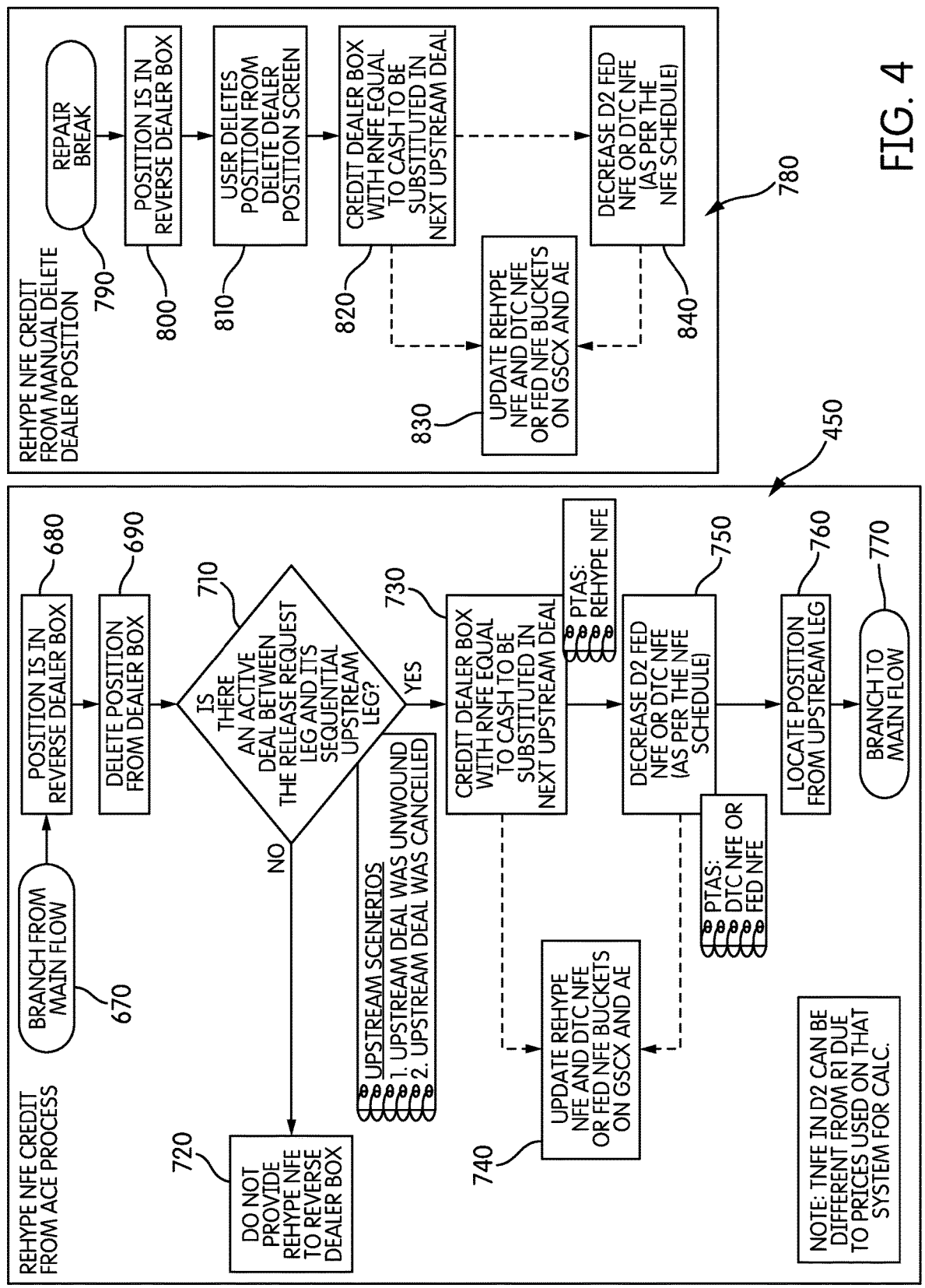

FIG. 4 illustrates an embodiment of the NFE workflow 450. As shown, the workflow 450 may branch from the process 340 at 670, and at 680 may determine the position is in the reverse dealer box. The NFE workflow 450 may continue at 690 by deleting the position from the dealer box. If it is determined at 700 that there is not an active deal between the release request leg and its sequential upstream leg, then the NFE workflow 450 may continue at 710 by not providing the rehypothecated NFE to the reverse dealer box. Such a situation may arise, for example, where the upstream deal was unwound or canceled. If it is determined at 700 that there is an active deal between the release request leg and its sequential upstream leg, then the NFE workflow 450 may, at 730, credit the dealer box with a rehypothecated NFE (RNFE) credit equal to the cash to be exchanged in the next upstream deal. In some embodiments, the NFE workflow 450 may, at 740, update the rehypothecated NFE and the DTC or FED NFE buckets on the GSCX or other systems. NFE workflow 450 may then continue from crediting the dealer box at 730 by decreasing the FED NFE or DTC NFE in the reverse dealer box, at 750. In an embodiment, the decreased NFE may be per an NFE schedule. The rehypothecated NFE, DTC NFE, and FED NFE may again be updated at 740 following the decrease in values at 750. Having established the NFE credit, NFE workflow 450 may continue at 760 by locating the position from the upstream leg, and returning back to the process 340, at 770.

Further illustrated in FIG. 4 is an NFE workflow 780 which may be utilized to update rehypothecated NFE credits when manually deleting dealer positions and/or repairing par breaks. Specifically, the repair mechanism may make par adjustments between the source accounts to be equal to the destination dealer box. The system may either delete/decrease the par or add/increase the par between two sequential legs during the repair. The destination par amount may be adjusted to match the par amount of all its source legs. In an embodiment, the system may increase or add the par amount in the reverse dealer box if the par in the reverse dealer box (and rehypothecated deals) is less than the originating source (the deal from the deal approval). The system may decrease the par amount in the reverse dealer box if the par in the reverse dealer box (and rehypothecated deals) is greater than originating source (the deal from deal approval). The system may delete a position in the reverse dealer box if the par in the reverse dealer box (and rehypothecated deals) does not exist in the originating source (the deal from deal approval). In the illustrated embodiment, when selecting to repair break at 790, NFE workflow 780 may proceed at 800 by determining the position is in the reverse dealer box. At 810, the user may delete the position from a delete dealer position screen, such as that illustrated in an exemplary embodiment in FIG. 5. Returning to the NFE workflow 780 in FIG. 4, once the position is deleted at 810, workflow 780 may continue at 820 by crediting the dealer box with a rehypothecated NFE (RNFE) credit equal to the cash to be exchanged in the next upstream deal. In some embodiments, the NFE workflow 780 may, at 830, update the rehypothecated NFE and the DTC or FED NFE buckets on the GSCX or other systems. NFE workflow 780 may then continue from crediting the dealer box at 820 by decreasing the FED NFE or DTC NFE in the reverse dealer box, at 840. In an embodiment, the decreased NFE may be per an NFE schedule. The rehypothecated NFE, DTC NFE, and FED NFE may again be updated at 830 following the decrease in values at 840.

As noted above, the rehypothecated collateral release process may vary in some embodiments, depending on whether the request is a FED collateral exchange request or a DTCC collateral exchange request. It may be appreciated that a release request received via DTCC may initiate the process to locate the position in the respective dealer box and deals. As leg 1 positions are located in the leg 1 dealer box, positions may be moved in a lockup account. If the position is located in downstream legs (i.e., rehypothecated), the system may generate a release request for each downstream leg, and then release the position from each upstream leg, as long as it meets the acceptable conditions. Once the position is located, the position may attempt to release the collateral from the furthest downstream leg, to the next upstream leg. After the position from each leg is successfully released, the release request may be fulfilled and returned back to DTCC. If a release request should fail at Leg 1, the system may continually reprocess the failed DTC automatic collateral exchange request. A release request must be fulfilled in its entirety before it can be released back to DTC.

Figures 1, 6:
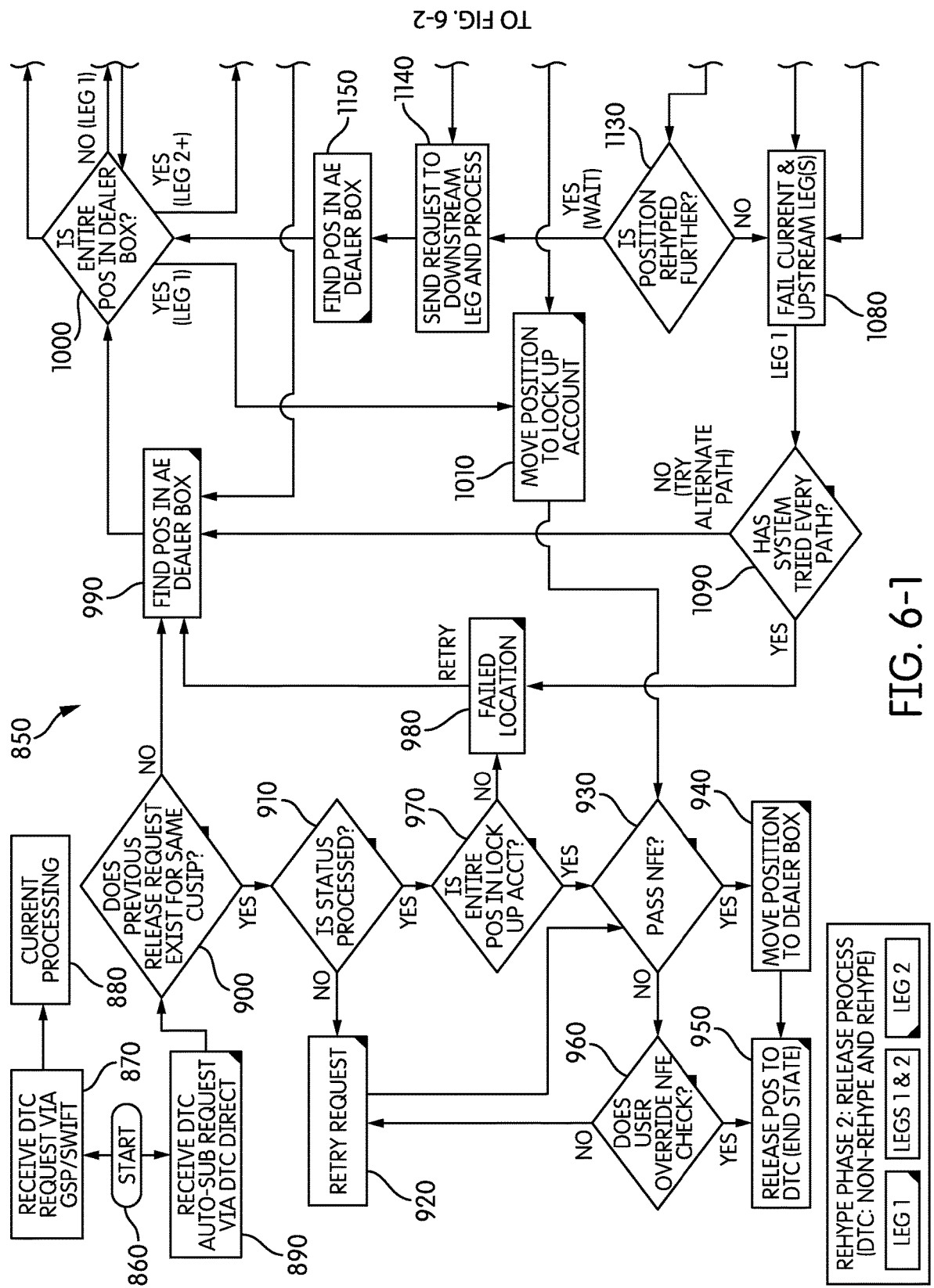
Figures 2, 6:
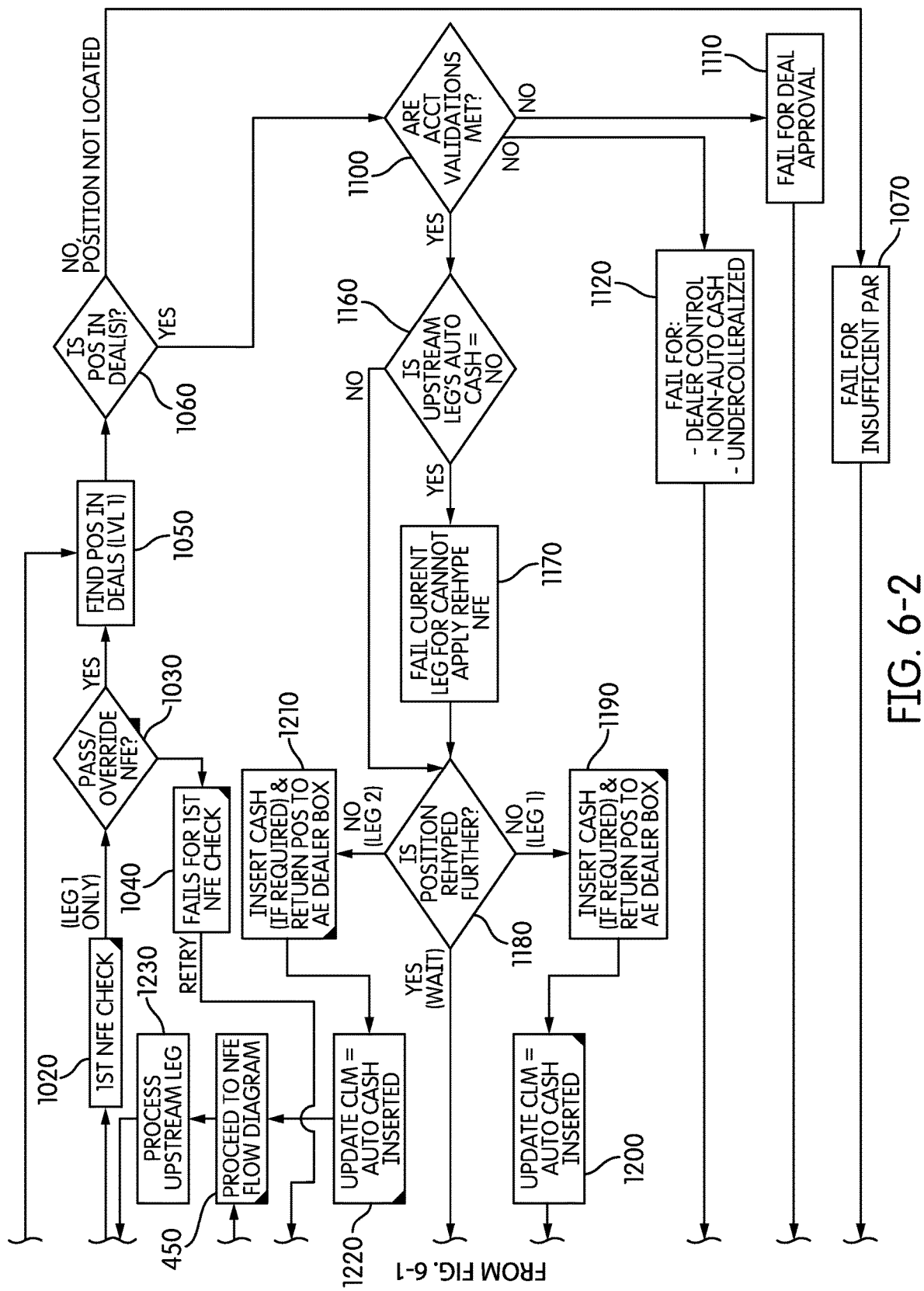

FIG. 6-1 and FIG. 6-2 illustrate an embodiment of a rehypothecated collateral release process 850 for a DTC collateral exchange request, which starts at 860. As shown, in an embodiment if the DTC request is received via GSP/SWIFT at 870, then process 850 may engage in processing 880. If the DTC automatic collateral exchange request is received via DTC direct at 890, then process 850 may continue at 900 by determining if a previous release request exists for the same CUSIP. It may be appreciated that in some embodiments, the release request may include one or more of the following information: a dealer box, a CUSIP (or other security identifier), a depository, an amount to be released, a parent dealer ID, DVP amount or Free, and a transaction ID. If a previous release request exists, then it may be determined at 910 whether the status is processed. If the status has not been processed, then process 850 may continue at 920 by retrying the request. Once the request is retried at 920, it may be determined if NFE passed at 930. If NFE passed, then at 940 the position may be moved to the dealer box, and at 950 the position may be released to DTC. If the NFE is not passed at 930, then at 960 it may be determined if the user overrides the NFE check. If the NFE check is overridden, then the position may be released to DTC at 950. If the user does not override the NFE check, then the request may be retried at 920. If the status is processed at 910, then it may be determined at 970 if the entire position is in a lockup account. If the entire position is in a lockup account, then process 850 may return to 930 and determine if NFE is passed. If not, then process 850 may indicate a failed location at 980.

If no previous release request exists for the same CUSIP (as determined at 900), or if a failed location is indicated at 980, then process 850 may continue at 990 by finding the position in the dealer box. It may then be determined at 1000 whether the entire position is in the dealer box. If, under leg 1, the entire position is in the dealer box, then process 850 may move the position to a lockup account at 1010, before returning to 930 to determine if the position passes NFE. If at 1000 the entire position is not in the dealer box under leg 1, then process 850 may perform a first NFE check at 1020. At 1030 it may be determined under leg 1 whether there is a pass or override of NFE. If at 1040 there is a failure for first NFE check, then process 850 may return to 990 to retry finding the position in the dealer box. If there is a pass or override of NFE at 1030, process 850 may proceed at 1050 by finding the position in level 1 of the deals.

Process 850 may determine at 1060 whether the position is in the deal(s). If not, then the position is not located, and process 850 may proceed at 1070 by failing for insufficient par, and continue at 1080 by failing the current and upstream legs. Process 850 may then determine at 1090 if the system has tried every path. If so, then process 850 may return to 980 by indicating a failed location. If not, then process 850 may try an alternate path, and may return to 990 to find the position in the dealer box.

If at 1060 it is determined that the position is in one or more deals, then process 850 may proceed at 1100 by determining if account validations are met. If the account validations are not met at 1100, then process 850 may fail for deal approval at 1110, and return to 1080 by failing current and upstream legs. If the account validations are not met at 1100, then process 850 may additionally or alternatively fail at 1120 for dealer control, non-auto cash, or undercollateralization. If failing at 1120, it may then be determined at 1130 whether the position is further rehypothecated. If the position is not further rehypothecated at 1130, then process 850 may return to 1080 by failing current and upstream legs. If the position is further rehypothecated at 1130, then (after a delay), process 850 may proceed at 1140 by sending the request to a downstream leg and reprocessing. The position may then be found in the dealer box in the downstream leg at 1150, before returning to 1000 to determine if the entire position is in the dealer box.

If account validations are met at 1100, then it may be determined at 1160 if the upstream leg's auto cash has a no condition. If so, then process 850 may fail the current leg at 1170, as the rehypothecated NFE could not be applied. If not, or after the leg is failed at 1170, then it may be determined at 1180 whether the position is further rehypothecated. If the position is further rehypothecated, then (after a delay) the request may be sent to the downstream leg and processed at 1140. If the position is not further rehypothecated at 1180, then under leg 1, cash may be inserted (if required) at 1190, and the position may be returned to the dealer box. Process 850 may in some embodiments update collateral maintenance level (e.g., by inserting auto-cash) at 1200, before moving the position to the lockup account at 1010. If the position is not further rehypothecated at 1180, then under leg 2 or more, cash may be inserted (if required) at 1210, and the position may be returned to the dealer box. Process 850 may in some embodiments update collateral maintenance level (e.g., by inserting auto-cash) at 1220, before proceeding to the NFE workflow at 450, described above. Once the NFE workflow is complete, then process 850 may proceed at 1230 by processing the upstream leg, and returning to determine if the entire position is in the dealer box at 1000.

In some embodiments, the collateral management system 140 may be configured to facilitate release of rehypothecated collateral for internal position movements. It may be appreciated that internal position movements may generate release requests to remove these positions from downstream legs. An internal position movement may occur from the middle leg (Leg N). The collateral released from the instructing leg may return the positions to the dealer box (if the client is set for a reallocation process) or GSCX dealer box (if the client is not set for a reallocation process).

Figures 1, 7:
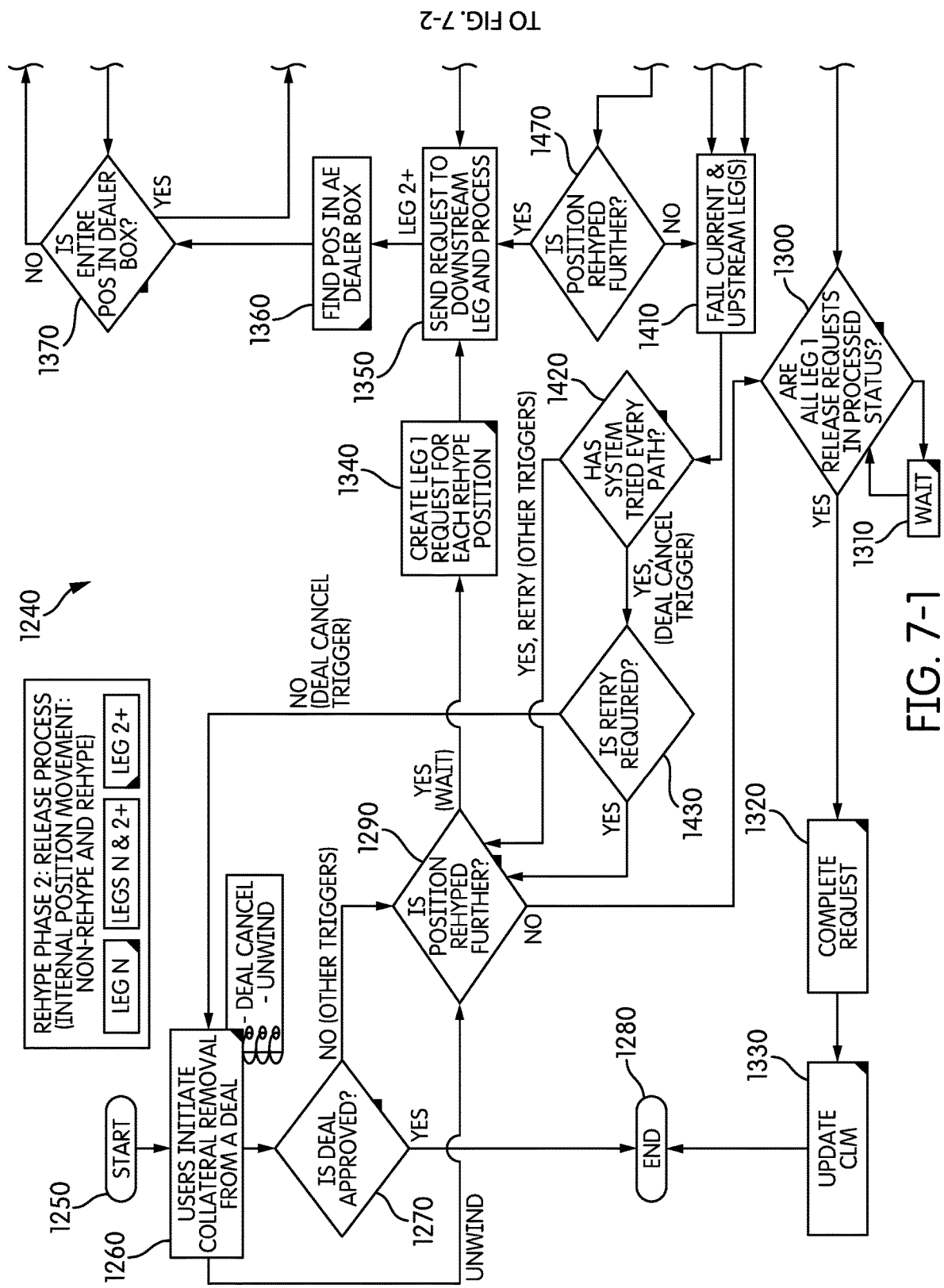
Figures 2, 7:
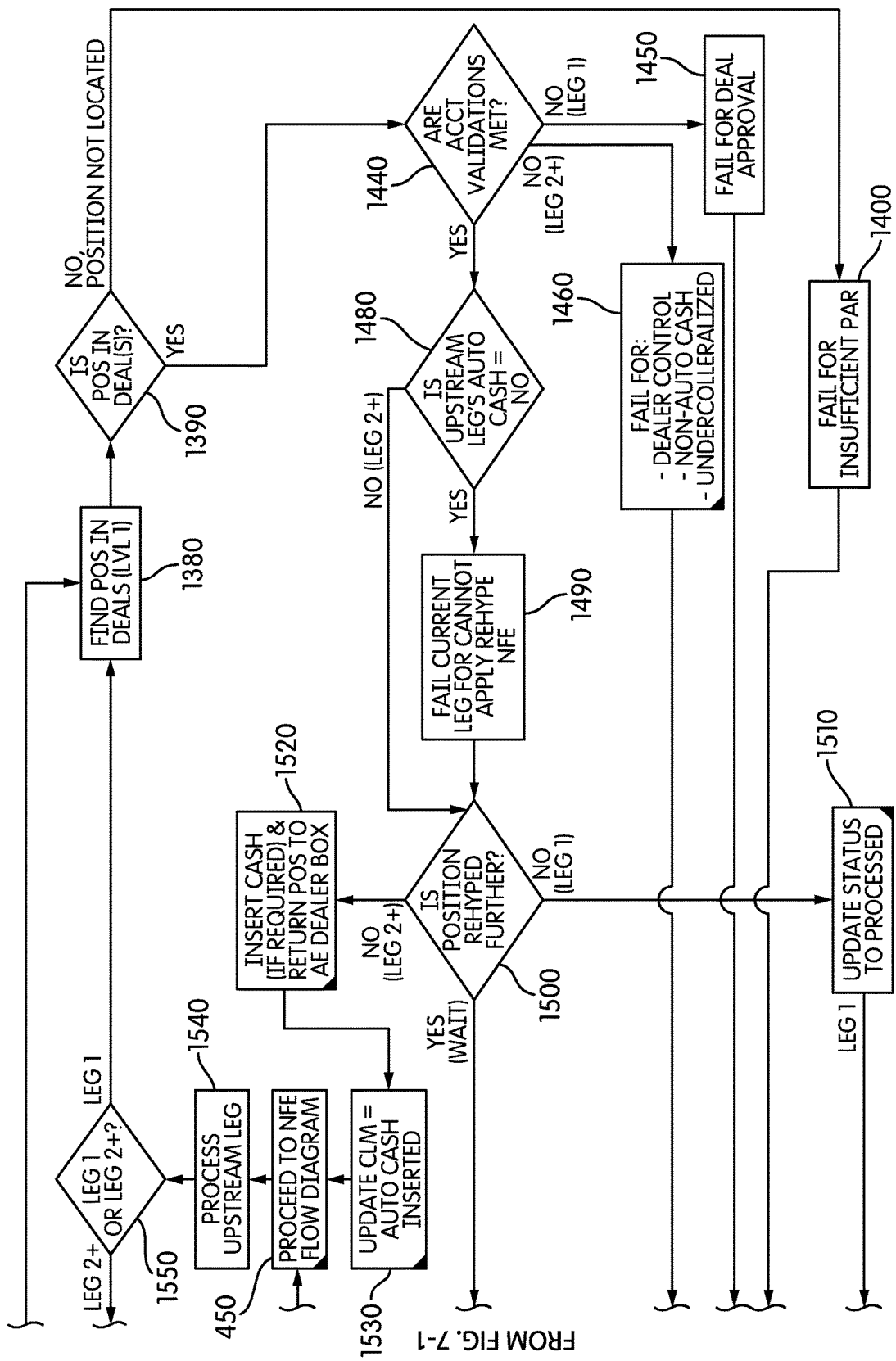

For example, FIG. 7-1 and FIG. 7-2 illustrate an embodiment of a release process 1240 for internal position movements for rehypothecated collateral. Release process 1240 starts at 1250, and proceeds at 1260 with users initiating collateral removal from a deal. Such collateral removal could comprise canceling a deal, or otherwise unwinding a deal. If it is determined at 1270 that the deal is already approved, then release process 1240 may end at 1280. If the deal is not approved at 1270 (e.g., there are other triggers), or if at 1260 the initiation is an unwinding procedure, then process 1240 may proceed at 1290 by determining if the position is further rehypothecated. If the position is not rehypothecated, then process 1240 may continue at 1300 by determining if all leg 1 release requests are in a processed status. If not, then process 1240 may wait at 1310, before checking again at 1300. In an embodiment the waiting at 1310 may be for any appropriate amount of time. In some embodiments the system may be configured to time out if an excessive amount of waiting at 1310 occurs. If it is determined at 1300 that all leg 1 release requests are in a processed status, then process 1240 may proceed at 1320 by indicating a completed request, and at 1330 by updating collateral maintenance level, before ending at 1280.

If it is determined at 1290 that the position is further rehypothecated, then (after a delay), process 1240 may proceed at 1340 by creating a leg 1 request for each rehypothecated position, before continuing at 1350 by sending the request to downstream legs and processes. Accordingly, for legs 2+, process 1240 may continue by finding the position in the dealer box at 1360, before determining at 1370 whether the entire position is in the dealer box. If the entire position is not in the dealer box at 1370, then process 1240 may continue at 1380 by finding the position in the deals (at level 1). It may be determined at 1390 whether the position is located in the deal(s). If it is not, then the position is not located, and process 1240 may fail at 1400 for insufficient par, before failing the current and upstream legs at 1410. If the system has then tried every path, as determined at 1420, then if the trigger was a deal cancel trigger, it may be determined at 1430 whether retry is required. If retry is required, then process 1240 may return to 1290 to determine if the position is rehypothecated further. If retry is not required (e.g., with the deal cancel trigger), then process 1240 may return to 1260, whereby a user may initiate collateral removal from a deal. It may be appreciated that if it is determined at 1420 that the system has tried every path based on other triggers, then process 1240 may return to 1290 by determining if the position is further rehypothecated. In some embodiments, paths may be marked or otherwise designated as having been attempted as the system tries them. As such, in an embodiment, the system may continue to try paths until the release request is canceled, or until a path is successful. In some embodiments, a delay may be implemented before repeating a path. In some embodiments, a path might only repeat a finite number of times, or may time out, before being automatically canceled.

Returning to the determination at 1390 as to whether the position is in the deal(s), if such is the case, then process 1240 may proceed at 1440 by determining if account validations are met. If not, then the process 1240 may fail at 1450 for deal approval, and may proceed to fail current and upstream legs at 1410. Process 1240 may alternatively fail at 1460 for dealer control, non-auto cash, and undercollateralization, and may proceed at 1470 by determining if the position is further rehypothecated. If the position is not further rehypothecated, then the process 1240 may fail current and upstream legs at 1410. If the position is further rehypothecated at 1470, then process 1240 may return to 1350 by sending the request to downstream legs and processing accordingly.

If at 1440 it is determined that account validations are met, it may be determined at 1480 if the upstream leg's auto cash has a no condition. If so, then process 1240 may fail the current leg at 1490, as the rehypothecated NFE could not be applied. If not, or after the leg is failed at 1490, then it may be determined at 1500 whether the position is further rehypothecated. If the position is further rehypothecated, then (after a delay) the request may be sent to the downstream leg and processed at 1350. If the position is not further rehypothecated at 1500, then under leg 1, the status may be updated to processed at 1510. If the position is not further rehypothecated at 1500, then under leg 2 or more, cash may be inserted (if required) at 1520, and the position may be returned to the dealer box. Process 1240 may in some embodiments update collateral maintenance level (e.g., by inserting auto-cash) at 1530, before proceeding to the NFE workflow at 450, described above. Once the NFE workflow is complete, then process 1240 may proceed at 1540 by processing the upstream leg. It may then be determined at 1550 whether the current process is of leg 1 or leg 2+. If it is still at leg 1, then process 1240 may return to 1380 to find positions in level 1 of the deals. If it is leg 2 or more, then process 1240 may return to 1370 to determine if the entire position is in the dealer box. It may be appreciated that if it is determined at 1370 that the entire position is in the dealer box, then process 1240 may proceed to the NFE workflow at 450 as described above.

Figures 1, 8:
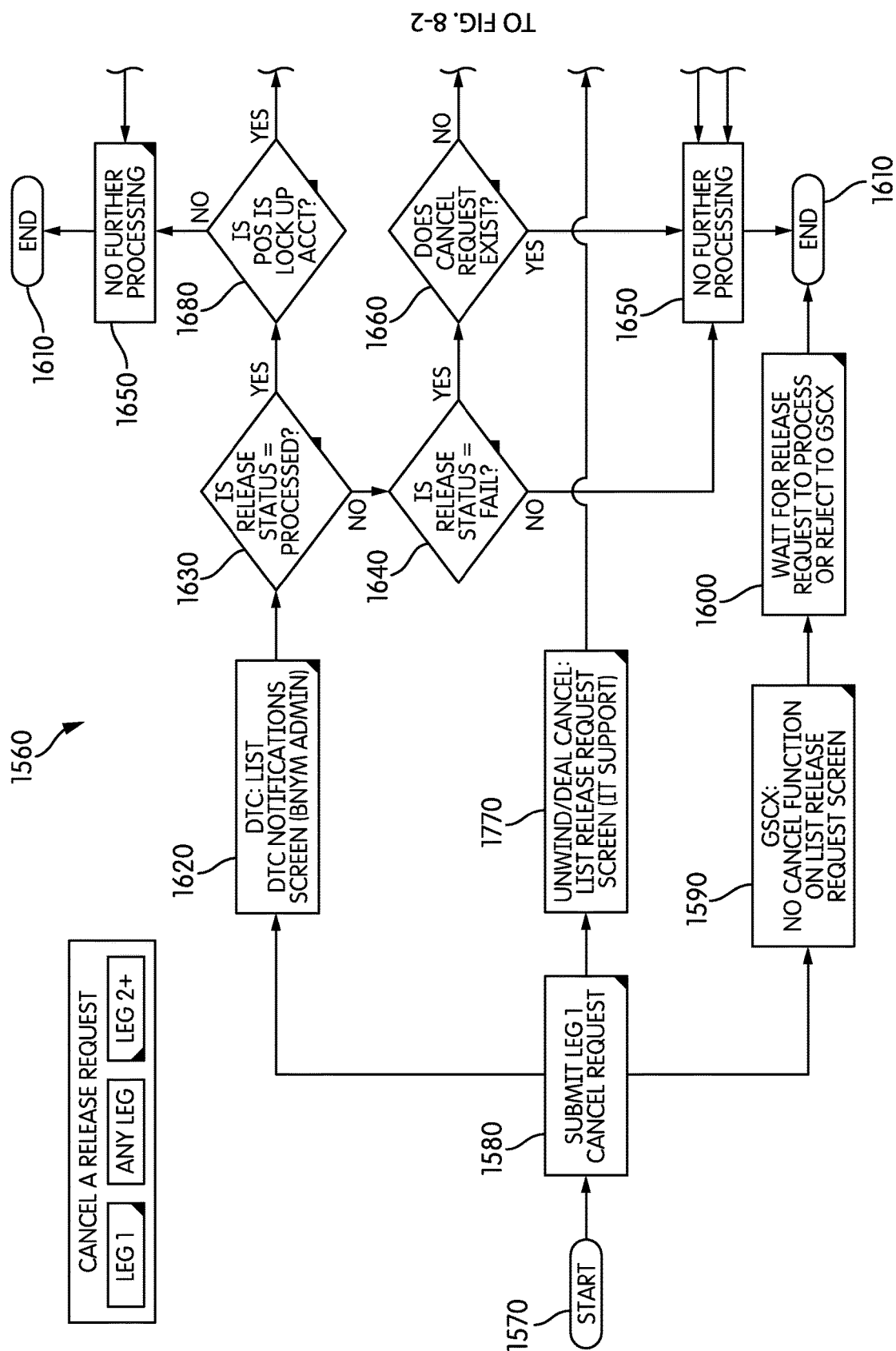
Figures 2, 8:
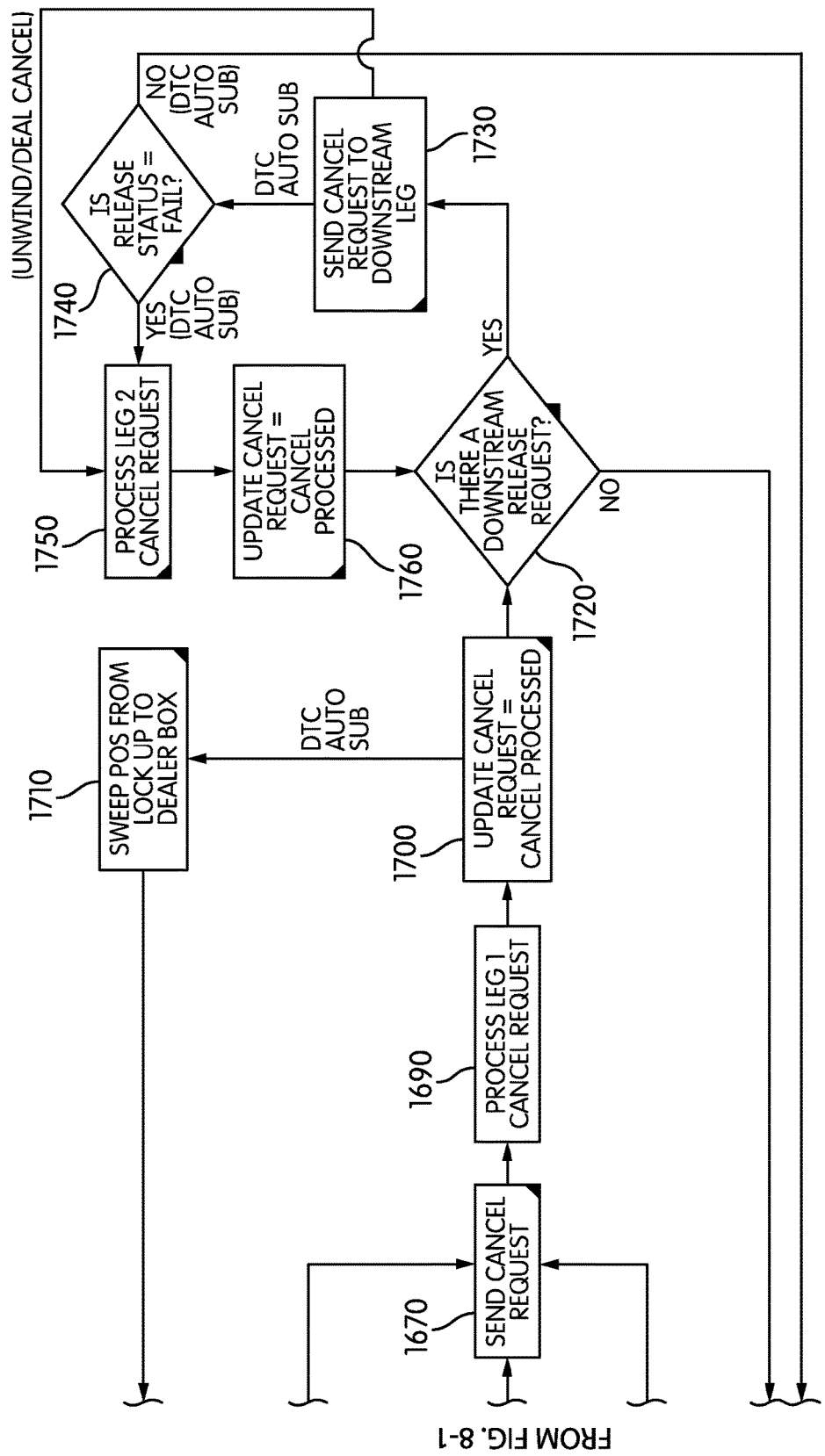

In an embodiment, the collateral management system 140 may be configured to facilitating canceling a request to release rehypothecated collateral. For example, as shown in FIG. 8-1 and FIG. 8-2, a cancellation process 1560 may start at 1570, and continue at 1580 by receiving a submitted leg 1 cancellation request. In an embodiment, a user interface may display a list of pending release requests (e.g., those submitted through processes 340, 850, or 1240). As shown at 1590, cancellation might not be available for GSCX securities submitted through process 340, and as such, there might not be a cancellation function presented associated with GSCX release requests. As such, process 1560 may continue at 1600 for GSCX requests by waiting for the release request to process or otherwise reject to GSCX, before ending at 1610.

As indicated at 1620, cancellation of a DTC request (e.g., those submitted through process 850) may be received via a DTC notifications screen listing DTC release requests and their associated statuses. Process 1560 may continue at 1630 by determining if the release status for the DTC request is processed. If it is not processed at 1630, then process 1560 may continue at 1640 by determining if the release status is a failure. If the release status is not a failure at 1640, then no further processing may be required, as indicated at 1650, and process 1560 may terminate at 1610. If the release status is a failure at 1640, then process 1560 may continue at 1660 by determining if a cancellation request exists. If so, then no further processing is required at 1650, and the process 1560 may terminate at 1610. If the cancellation request does not exist at 1660 then process 1560 may proceed by sending the cancellation request at 1670.

If the release status at 1630 is processed, then process 1560 may determine if the position is in the lockup account at 1680. If so, then process 1560 may also proceed at 1670 by sending the cancellation request. If the position is not in the lockup account at 1680, however, then no further processing is required at 1650, and process 1560 may terminate at 1610.

Where a cancellation request is sent at 1670, process 1560 may proceed at 1690 by processing the leg 1 cancellation request, and continue at 1700 by updating the cancellation request to indicate that the cancellation is processed. For DTC collateral exchange processes (e.g., those submitted through process 850), the position may be swept from the lockup account to the dealer box at 1710. Such a sweep may comprise verifying that any position in the DTC lockup accounts is moved back to the dealer box to make the position available for reallocation. Process 1560 may then continue by determining that no further processing is needed at 1650, and ending at 1610. After the cancellation request is updated to indicate cancellation is processed at 1700, process 1560 may continue at 1720 by determining if there is a downstream release request. If there is not, then no further processing is needed at 1650, and process 1560 may end at 1610. If there is a downstream release request at 1720, however, then the cancellation request may be sent to the downstream leg at 1730. For DTC collateral exchange processes, it may then be determined at 1740 whether the release status failed. If not, then process 1560 may determine that there is no further processing at 1650, and may end at 1610. If there is a failed release status at 1740, then the leg 2 cancellation request may be processed at 1750. Process 1560 may then continue at 1760 by updating the cancellation request to indicate that the cancellation request is processed, before returning to 1720 by determining if there is a further downstream release request. Once there are no further downstream release requests at 1720, process 1560 may determine no further processing needed at 1650, and may end at 1610.

It may then be appreciated that the submitted leg 1 cancellation request at 1580 may also be applicable to unwinding/deal cancellations, as indicated at 1770. In some embodiments, cancelling a release request may be a technical task (e.g., something required due to critical system issues) rather than a business task. As such business users may simply be notified of pending cancellations initiated by technology support users. In an embodiment, for such cancellation requests process 1560 may continue from 1770 to sending the cancellation request at 1670. In such unwindings or deal cancellations, process 1560 might not proceed at 1710 by sweeping positions from a lockup account to a dealer box. Additionally, if there are downstream release requests at 1720, then after sending the cancellation request to the downstream leg at 1730, process 1560 may proceed directly to processing the leg 2 cancellation request at 1750, without determining if the release status failed at 1740. In an embodiment, a request which is canceled may cancel up to the point that was already processed. For example, it is possible that a Leg 3 release request is in progress when the user attempts to cancel the Leg 1 release request. At the time the user cancels the Leg 1 release request, the Leg 3 release request can be in progress or changed to a processed state. If processed, this means the position was deleted from Leg 3 and the user must reapprove Leg 2 deal in order to clone the positions back to Leg 3.

The user interface associated with the collateral management system 140, which may be configured to engage the operator input/output and display module 165, may vary across embodiments. For example, in some embodiments dealers (e.g., sellers 110) may be able to view their own associated collateral positions and release request statuses. Administrators (e.g., the platform manager 120, the tri-party agent, or so on) may have access to all release request attempts in some embodiments. In an embodiment, to request release of collateral, the user interface may allow for selection of the originating system (e.g., domestic system(s) and/or global system(s)), the originating release type (e.g. one or more of cancelling an allocation, cancelling a deal, cancelling a position feed, exchanging collateral, DTC, GSCX, unwind, and optimization), and a status (e.g., one or more of canceled, completed, pending, failed, or wait). The release request interface may also allow selection of sub-statuses. For example, if the status is failed, the sub status may be one or more of blocked, failed location, insufficient collateral, and system. If the status is pending, the sub status may be one or more of pending, pending with override, and pending with block. If the status is waiting, the sub status may be one or more of wait, wait with override, and wait with block.

In an embodiment, available actions that may be selected include none, cancel, and reprocess. If none, then release request options may be presented, including source system, originating system, release type, and status and/or sub status. Such statuses may similarly appear for a cancel action, however statuses and/or sub-statuses may be limited to failed statuses. In an embodiment, if reprocess is selected, then failed statuses may be displayed.

Figure 9:
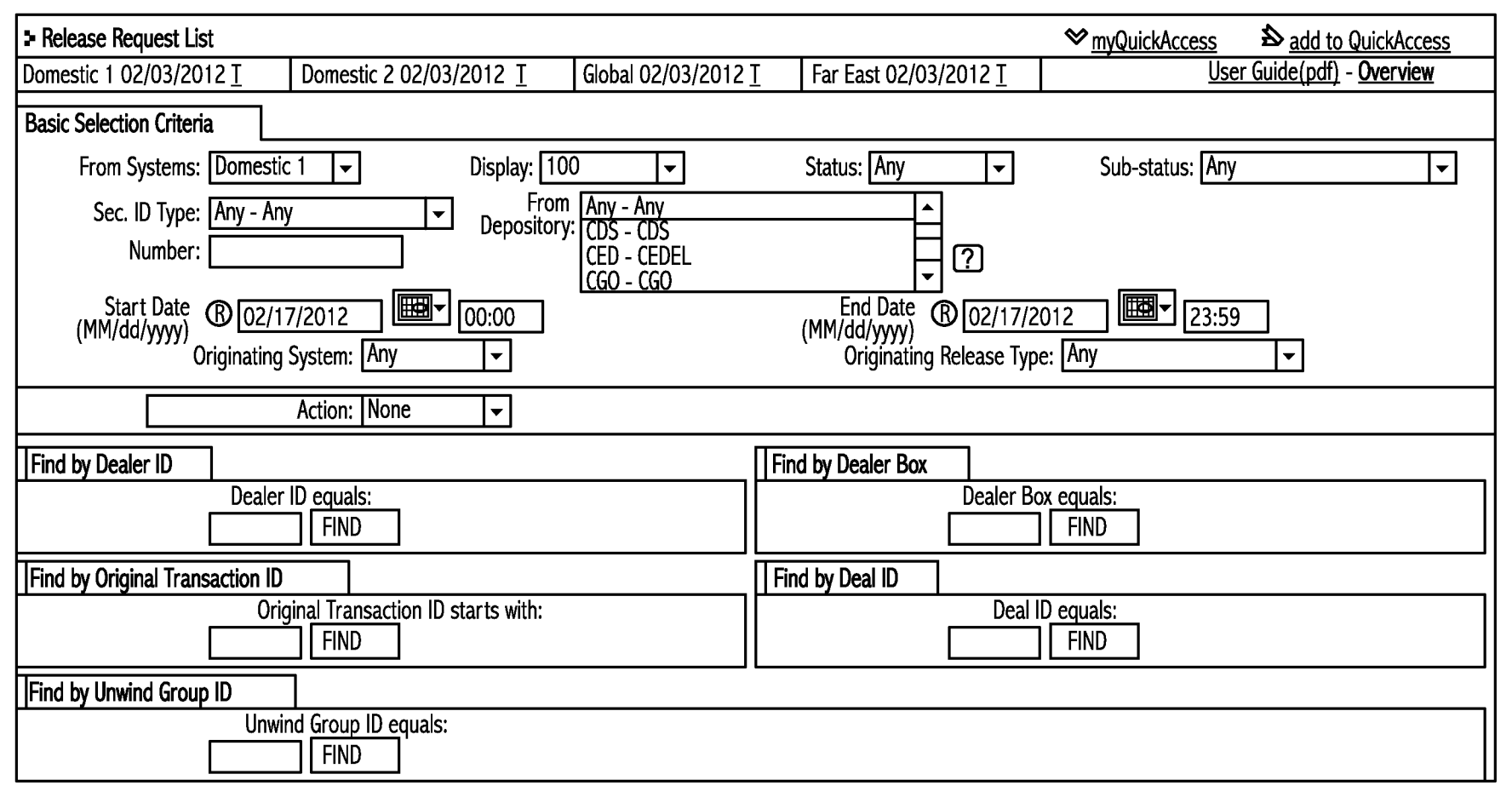

The user interface may facilitate finding release requests, deals and/or positions by a variety of search criteria. For example, deals and/or positions may be found by dealer box, original transaction IDs (e.g., for FED and DTC release requests), parent dealer ID, deal ID, dealer ID, and unwind group (for unwind triggered release requests). An example of such a release request search criteria is illustrated in FIG. 9.

Figure 10:
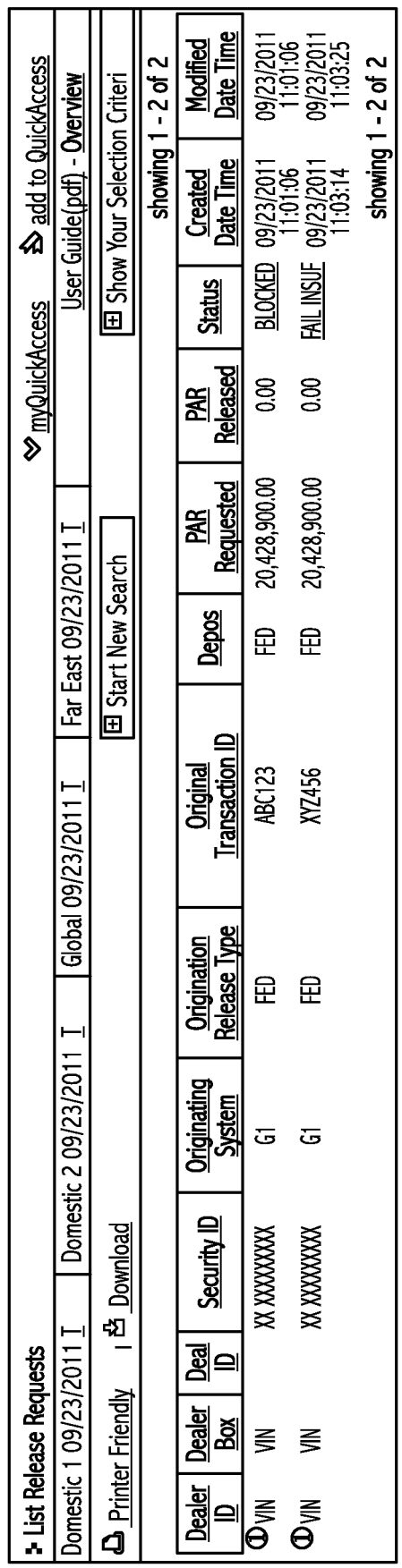
FIG. 10 illustrates an embodiment of a user interface configured to display various release requests.

The user interface may also list release requests, as illustrated in FIG. 10. As shown, in some embodiments the list of release requests may display one or more of the associated system, the dealer box, the dealer ID, the deal ID (e.g., if the release was from a specific deal or inactive account), the security ID type, the security number, the originating release type, the original transaction ID, the depository, the par requested (e.g., in USD), the par released (e.g., in USD), a status, a created date/time, and a modified date/time. In an embodiment, selecting the status, or another region associated with a particular transaction or identifier, may link to a leg summary screen of the user interface. FIG. 11 illustrates an embodiment of such a leg summary screen, which in an embodiment may include originating request information (e.g., Originating Dealer ID, Originating Dealer Box, Originating Release Type, Originating Transaction ID Security ID Type and Number, Depository, Source System, and Par Requested). The leg summary screen may also show the leg summary associated therewith, which may include, for example, System, Instruction ID, Cloned From, Cloned To, Leg Number, Dealer Box, Par Requested, Par Released, Status, Created Date/Time, and Modified Date/Time.

By selecting one of the legs on the leg summary view of the user interface, a leg details view may be presented. For example, a leg details screen may display the individual release requests for the leg/dealer selected from the leg summary screen. As shown in FIG. 12, in an embodiment the leg details screen may illustrate details of the originating request, including but not limited to details in those categories described above. The details of the particular leg may also be displayed, including, for example, the system, instruction ID, release attempt ID, instruction status, eligibility code, par released, par, requested, a work plan message, and a date/time stamp associated therewith. Examples of various work plan messages, associated eligibility codes, and the situations associated therewith are illustrated in Table 1 below:

TABLE 1

| Work Plan Message | Eligibility Code | Situation |
|---|---|---|
| Processed | Y | The collateral amount indicated in the account was successfully processed |
| Undercollateralized Account | N | The collateral amount is in an account that is undercollateralized and is not permitted |

TABLE 1-continued

| Work Plan Message | Eligibility Code | Situation |
|---|---|---|
| Dealer Controlled Account | N | The collateral amount is in a dealer controlled account and will not be touched |
| Remaining Rehyped Collateral Not Needed | N | The collateral amount indicated in the account is rehyped downstream but is not needed for the request |
| Deal Approved | N | The collateral amount is in a deal that is approved (Bank or double approved)and will not be touched |
| Auto Cash Not Enabled | N | The collateral amount is in an account where Auto Cash is not enabled and will not be touched |
| Remaining Collateral Not Needed | L | The collateral amount indicated in the account was not needed for the request |
| Rehyped Collateral | C | Collateral is rehyped downstream |
| Generated ACE Request | W | The collateral amount indicated in the account is rehyped downstream and has been requested |
| Pending Collateral for OOS FED Request | W | The collateral amount is for a FED Release request but is awaiting proper processing sequencing to support Build a Box requirements |
| Release Request is older than today | X | Release request is older than today. |
| Position in BLOCK mode | F | The collateral amount indicated could not be released in a FED Release request because the collateral is in BLOCK mode with a failure in an previous attempt |
| DTC Lockup Account Missing | F | DTC Lockup Account is either not defined or created |
| Various system failure messages | F | The release request has failed due to a system error. |
| Dealer Box Unavailable | F | The Dealer box specified to return the collateral amount to is either not defined or created |

In some embodiments, if a start date of the release request is equal to the current date (e.g., business date), then a release request may be reprocessed. In an embodiment, the user interface may facilitate such reprocessing, by displaying associated failed release requests. As shown in FIG. 13, in an embodiment the user interface may display one or more of the System, Dealer ID, Dealer Box, Deal ID, Par Requested, Security ID, Release Type, Original Transaction ID, Status, Created Date/Time, and Modified Time.

In some embodiments, the user interface may be configured to generate or display a reconciliation report associated with rehypothecation and repair of par breaks and position tracking breaks. Such a user interface may additionally or alternatively be configured to display a deal report, a report of par breaks, and an associated summary. In an embodiment, the reconciliation report may display one or more of a Security ID, Source Par, Source Rehypothecated Par, Destination Par, and Destination Rehypothecated Par. In some embodiments, for example, the source account, the par amount, and the total may be displayed for each par category.

The above-discussed embodiments and aspects of this disclosure are not intended to be limiting, but have been shown and described for the purposes of illustrating the functional and structural principles of the inventive concept, and are intended to encompass various modifications that would be within the spirit and scope of the following claims.

Various embodiments may be described herein as including a particular feature, structure, or characteristic, but every aspect or embodiment may not necessarily include the particular feature, structure, or characteristic. Further, when a particular feature, structure, or characteristic is described in connection with an embodiment, it will be understood that such feature, structure, or characteristic may be included in connection with other embodiments, whether or not explicitly described. Thus, various changes and modifications may be made to this disclosure without departing from the scope or spirit of the inventive concept described herein. As such, the specification and drawings should be regarded as examples only, and the scope of the inventive concept to be determined solely by the appended claims.

What is claimed is:

1. A system for facilitating concurrency related to rehypothecated allocations via pre-release of associated downstream positions and locking of the rehypothecated allocations prior to their release, the system comprising:
   a computer system comprising one or more processors programmed with computer program instructions that, when executed, cause the computer system to:
   track a plurality of different collateral allocations by respective records identifying sources and amounts of collateral being cloned downstream from the collateral allocations;
   obtain a request to release a collateral allocation in the plurality of different collateral allocations, wherein each of at least some of the collateral allocations are associated with a rehypothecated position and one or more downstream cloned positions of the rehypothecated position, each cloned position being derived from the rehypothecated position upstream of the cloned position or a prior upstream cloned position;
   locate, responsive to the release request, a rehypothecated position and a set of cloned positions related to the collateral allocation based on the records, the locating comprising traversing two or more legs to locate the rehypothecated position and a cloned position on a furthest downstream leg from the rehypothecated position;
   determine if the rehypothecated position is further rehypothecated;
   perform a delay if the rehypothecated position is further rehypothecated;
   create a leg 1 request for each further rehypothecated position;
   send the request to downstream legs and processes;
   determine if all leg 1 release requests are in a processed status;
   reassess if all release requests in the leg 1 are in a processed status after a delay;
   time out a corresponding leg 1 release request if an excessive amount of waiting occurs;

indicate a completed request for all leg 1 release requests in the processed status;

update a collateral maintenance level for all leg 1 release requests in the processed status;

find the rehypothecated position in a dealer box;

determine whether the entire position is in the dealer box;

determine whether the release request should fail for insufficient par;

release, responsive to the release request and locating of the cloned position on the furthest downstream leg, the cloned position on the furthest downstream leg prior to release of the rehypothecated position and any other cloned positions in the set of cloned positions on upstream legs;

lock, responsive to one or more indications of release of the set of cloned positions, the rehypothecated position;

in response to locking the rehypothecated position, determining to release the rehypothecated position to fulfill the release request; and generate a user interface displaying a leg summary view, the leg summary view comprising information identifying sources and amounts of collateral cloned downstream from one or more of the collateral allocations on respective legs based on corresponding ones of the records;

wherein selection of one of the legs in the leg summary view of the user interface causes a leg details view to be generated in the user interface;

wherein the leg details view displays one or more individual release requests for the leg selected from the leg summary screen; and wherein, if a start date of a given release request is equal to a current date then the computer system is configured to reprocess the given release request.

2. The system of claim 1, wherein the release of the rehypothecated position is not performed in response to a determination that the rehypothecated position is not locked or any cloned position in the set of cloned positions is not released.

3. The system of claim 1, wherein the computer system is caused to:

assign a credit of net free equity (NFE) for the release of the cloned position on the furthest downstream leg such that the assigned credit is equal to an amount of cash to be exchanged at a next upstream leg of the furthest downstream leg.

4. The system of claim 1, wherein the collateral allocation is further associated with a second cloned position on a downstream leg that is upstream from the furthest downstream leg, the cloned position on the furthest downstream leg being derived from the second cloned position.

5. The system of claim 4, wherein the computer system is caused to:

release, based on the release request and responsive to releasing the cloned position on the furthest downstream leg, the second cloned position on the downstream leg that is upstream from the furthest downstream leg and lock the rehypothecated position after the release of the second cloned position and the cloned position.

6. The system of claim 1, wherein the information identifying sources and amount of collateral cloned downstream on a leg comprises:

one or more of an originating dealer identifier, originating dealer box identifier, and originating transaction identifier; and one or more of a cloned from identifier, cloned to identifier, and leg number identifier.

7. The system of claim 1, wherein the computer system is caused to:

iteratively release three or more cloned positions in the set of cloned positions from the cloned position on the furthest downstream leg to a most upstream cloned position prior to releasing the rehypothecated position upstream of the most upstream cloned position.

8. A method comprising:

tracking, by one or more processors, a plurality of different collateral allocations by respective records identifying sources and amounts of collateral being cloned downstream from the collateral allocations;

obtaining, by the one or more processors, a request to release a collateral allocation in the plurality of different collateral allocations, wherein each of at least some of the collateral allocations are associated with a rehypothecated position and one or more downstream cloned positions of the rehypothecated position, each cloned position being derived from the rehypothecated position upstream of the cloned position or a prior upstream cloned position;

locating, by the one or more processors, response to the release request, a rehypothecated position and a set of cloned positions related to the collateral allocation based on the records, the locating comprising traversing two or more legs to locate the rehypothecated position and a cloned position on a furthest downstream leg from the rehypothecated position;

determining, by the one or more processors, if the rehypothecated position is further rehypothecated;

performing, by the one or more processors, a delay if the rehypothecated position is further rehypothecated;

creating, by the one or more processors, a leg 1 request for each further rehypothecated position;

sending, by the one or more processors, the request to downstream legs and processes;

determining, by the one or more processors, if all leg 1 release requests are in a processed status;

reassessing, by the one or more processors, if all leg 1 release requests are in a processed status after a delay;

timing out, by the one or more processors, a corresponding leg 1 release request if an excessive amount of waiting occurs;

indicating, by the one or more processors, a completed request for all leg 1 release requests in the processed status;

updating, by the one or more processors, a collateral maintenance level for all leg 1 release requests in the processed status;

finding, by the one or more processors, the rehypothecated position in a dealer box;

determining, by the one or more processors, whether the entire position is in the dealer box;

determining, by the one or more processors, whether the release request should fail for insufficient par;

releasing, by the one or more processors, responsive to the release request and locating of the cloned position on the furthest downstream leg, the cloned position on the furthest downstream leg prior to release of the rehypothecated position and any other cloned positions in the set of cloned positions on upstream legs;

locking, by the one or more processors, responsive to one or more indications of release of the set of cloned positions, the rehypothecated position;

determining, by the one or more processors, in response to locking the rehypothecated position, to release the rehypothecated position to fulfill the release request; and generating a user interface displaying a leg summary view, the leg summary view comprising information identifying sources and amounts of collateral cloned downstream from one or more of the collateral allocations on respective legs based on corresponding ones of the records;

wherein selection of one of the legs in the leg summary view of the user interface causes a leg details view to be generated in the user interface;

wherein the leg details view displays one or more individual release requests for the leg selected from the leg summary screen; and wherein, if a start date of a given release request is equal to a current date then the computer system is configured to reprocess the given release request.

9. The method of claim 8, wherein the release of the rehypothecated position is not performed in response to a determination that the rehypothecated position is not locked or any cloned position in the set of cloned positions is not released.

10. The method of claim 8, further comprising:
assigning, by the one or more processors, a credit of net free equity (NFE) for the release of the cloned position on the furthest downstream leg such that the assigned credit is equal to an amount of cash to be exchanged at a next upstream leg of the furthest downstream leg.

11. The method of claim 8, further comprising:
releasing, by the one or more processors, based on the release request, the rehypothecated position in response to determining the set of cloned positions are released and the rehypothecated position is locked.

12. The method of claim 8, wherein the collateral allocation is further associated with a second cloned position on a downstream leg that is upstream from the furthest downstream leg, the cloned position on the furthest downstream leg being derived from the second cloned position.

13. The method of claim 12, further comprising:
releasing, by the one or more processors, based on the release request and responsive to releasing the cloned position on the furthest downstream leg, the second cloned position on the downstream leg that is upstream from the furthest downstream leg and locking the rehypothecated position after the release of the second cloned position.

14. The method of claim 8, wherein the information identifying sources and amount of collateral cloned downstream on a leg comprises:
one or more of an originating dealer identifier, originating dealer box identifier, and originating transaction identifier; and
one or more of a cloned from identifier, cloned to identifier, and leg number identifier.

15. A non-transitory, computer-readable storage media comprising instructions that, when executed by one or more processors, cause operations comprising:
tracking a plurality of different collateral allocations by respective records identifying sources and amounts of collateral being cloned downstream from the collateral allocations;

obtaining a request to release a collateral allocation in the plurality of different collateral allocations, wherein each of at least some of the collateral allocations are associated with a rehypothecated position and one or more downstream cloned positions of the rehypothecated position, each cloned position being derived from the rehypothecated position upstream of the cloned position or a prior upstream cloned position;

locating, responsive to the release request, a rehypothecated position and a set of cloned positions related to the collateral allocation based on the records, the locating comprising traversing two or more legs to locate the rehypothecated position and a cloned position on a furthest downstream leg from the rehypothecated position;

determining if the rehypothecated position is further rehypothecated;

performing a delay if the rehypothecated position is further rehypothecated;

creating a leg 1 request for each further rehypothecated position;

sending the request to downstream legs and processes;

determining if all leg 1 release requests are in a processed status;

reassessing if all leg 1 release requests are in a processed status after a delay;

timing out a corresponding leg 1 release request if an excessive amount of waiting occurs;

indicating a completed request for all leg 1 release requests in the processed status;

updating a collateral maintenance level for all leg 1 release requests in the processed status;

finding the rehypothecated position in a dealer box;

determining whether the entire position is in the dealer box;

determining whether the release request should fail for insufficient par;

releasing, responsive to the release request and locating of the cloned position on the furthest downstream leg, the cloned position on the furthest downstream leg prior to release of the rehypothecated position and any other cloned positions in the set of cloned positions on upstream legs;

lock, responsive to one or more indications of release of the set of cloned positions, the rehypothecated position;

in response to locking the rehypothecated position, determining to release the rehypothecated position to fulfill the release request; and generating a user interface displaying a leg summary view, the leg summary view comprising information identifying sources and amounts of collateral cloned downstream from one or more of the collateral allocations on respective legs based on corresponding ones of the records;

wherein selection of one of the legs in the leg summary view of the user interface causes a leg details view to be generated in the user interface;

wherein the leg details view displays one or more individual release requests for the leg selected from the leg summary screen; and wherein, if a start date of a given release request is equal to a current date then the computer system is configured to reprocess the given release request.

16. The non-transitory, computer-readable storage media of claim 15, wherein the release of the rehypothecated position is not performed in response to a determination that the rehypothecated position is not locked or any cloned position in the set of cloned positions is not released.

17. The non-transitory, computer-readable storage media of claim 15, the operations further comprising:
assigning a credit of net free equity (NFE) for the release of the cloned position on the furthest downstream leg such that the assigned credit is equal to an amount of cash to be exchanged at a next upstream leg of the furthest downstream leg.

18. The non-transitory, computer-readable storage media of claim 15, the operations further comprising:
releasing, based on the release request, the rehypothecated position in response to determining the set of cloned positions are released and the rehypothecated position is locked.

19. The non-transitory, computer-readable storage media of claim 15, wherein the collateral allocation is further associated with a second cloned position on a downstream leg that is upstream from the furthest downstream leg, the cloned position on the furthest downstream leg being derived from the cloned second position.

20. The non-transitory, computer-readable storage media of claim 19, further comprising:
releasing, based on the release request and responsive to releasing the cloned position on the furthest downstream leg, the second cloned position on the downstream leg the is upstream from the furthest downstream leg and locking the rehypothecated position after the release of the second cloned position.

\* \* \* \* \*